US011339009B2

(12) United States Patent
Slurink

(10) Patent No.: US 11,339,009 B2
(45) Date of Patent: May 24, 2022

(54) SYSTEM FOR PERFORMING A PROCESSING STEP ON DEVICE PARTS OF SIMULATED SMOKING DEVICES, SUCH AS ELECTRONIC CIGARETTES

(71) Applicant: Sluis Cigar Machinery B.V., Kampen (NL)

(72) Inventor: Oscar Slurink, Heino (NL)

(73) Assignee: SLUIS CIGAR MACHINERY B.V., Kampen (NL)

( * ) Notice: Subject to any disclaimer, the term of this patent is extended or adjusted under 35 U.S.C. 154(b) by 0 days.

(21) Appl. No.: 17/261,507

(22) PCT Filed: Jul. 19, 2019

(86) PCT No.: PCT/NL2019/050464
§ 371 (c)(1),
(2) Date: Jan. 19, 2021

(87) PCT Pub. No.: WO2020/017970
PCT Pub. Date: Jan. 23, 2020

(65) Prior Publication Data
US 2021/0292103 A1     Sep. 23, 2021

(30) Foreign Application Priority Data

Jul. 19, 2018  (NL) .................................... 2021347

(51) Int. Cl.
*B65G 47/84*     (2006.01)
*A24F 40/70*     (2020.01)
(Continued)

(52) U.S. Cl.
CPC ............ *B65G 47/846* (2013.01); *A24F 40/70* (2020.01); *B65B 43/54* (2013.01); *B65G 17/32* (2013.01);
(Continued)

(58) Field of Classification Search
CPC .......... A24F 40/70; A24F 40/18; A24F 47/00; B65B 43/54; B65B 43/60; B65B 43/62;
(Continued)

(56) References Cited

U.S. PATENT DOCUMENTS 3,469,671 A * 9/1969 Mencacci ............... A23L 3/045
                                                 198/418.2
3,583,544 A * 6/1971 Prodzenski ............... B08B 9/30
                                                 198/803.14
(Continued)

FOREIGN PATENT DOCUMENTS

CN    108820845 A  * 11/2018 ............. B65G 47/84
EP     2944206 A1     11/2015
(Continued)

OTHER PUBLICATIONS

International Search Report and Written Opinion dated Sep. 4, 2019, corresponding to Application No. PCT/NL2019/050464.
(Continued)

*Primary Examiner* — James R Bidwell
(74) *Attorney, Agent, or Firm* — Patterson & Sheridan, L.L.P.

(57) ABSTRACT

A system for performing a processing step on device parts of simulated smoking devices, such as electronic cigarettes, system comprising a processing station to perform the processing step on the device parts, product carriers to hold the device parts during the processing step, a first transport device and a second transport device to move the product carriers along at least part of a processing trajectory extending through the processing station.

20 Claims, 24 Drawing Sheets

Figure 1:
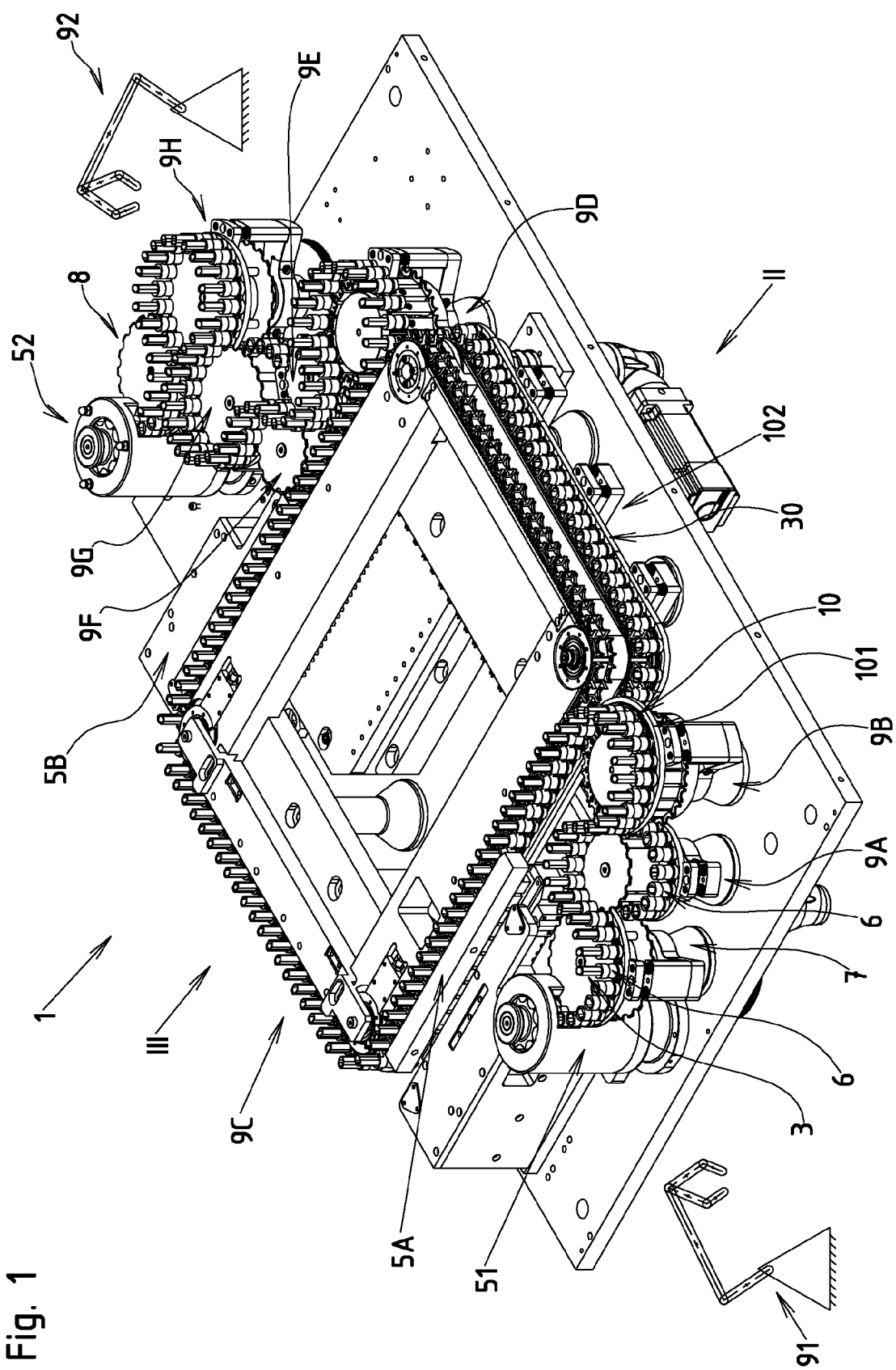

(51) Int. Cl.
*B65B 43/54* (2006.01)
*B65G 17/32* (2006.01)
*B65G 29/00* (2006.01)

(52) U.S. Cl.
CPC ...... *B65G 29/00* (2013.01); *B65G 2201/0261* (2013.01)

(58) Field of Classification Search
CPC ................. B65G 47/846; B65G 47/84; B65G 2201/0261; B65G 17/32; B65G 29/00
USPC ............................ 198/867.11, 803.14, 478.1
See application file for complete search history.

(56) References Cited

U.S. PATENT DOCUMENTS

| | | | | |
|---|---|---|---|---|
| 3,591,027 A * | 7/1971 | East | ........................ | B08B 9/42 198/803.14 |
| 4,305,496 A * | 12/1981 | Hoppmann | ............ | B65B 35/26 198/465.1 |
| 6,293,387 B1 * | 9/2001 | Forster | ................. | B65G 47/248 198/795 |
| 6,390,272 B1 * | 5/2002 | Tsutsui | ................... | B65B 43/52 198/803.14 |
| 8,978,552 B2 * | 3/2015 | Preckel | ................. | B41J 3/4073 198/377.01 |
| 2020/0107580 A1 * | 4/2020 | Testoni | .................. | B65B 43/52 |

FOREIGN PATENT DOCUMENTS

| | | | | |
|---|---|---|---|---|
| WO | 2013029710 A1 | 3/2013 | | |
| WO | 2018/016950 | * | 1/2018 | ............ A24F 47/00 |
| WO | 2018016950 A1 | 1/2018 | | |

OTHER PUBLICATIONS

Netherlands Seach Report and Written Opinion dated Feb. 19, 2019, corresponding to Application No. 2021347.

* cited by examiner

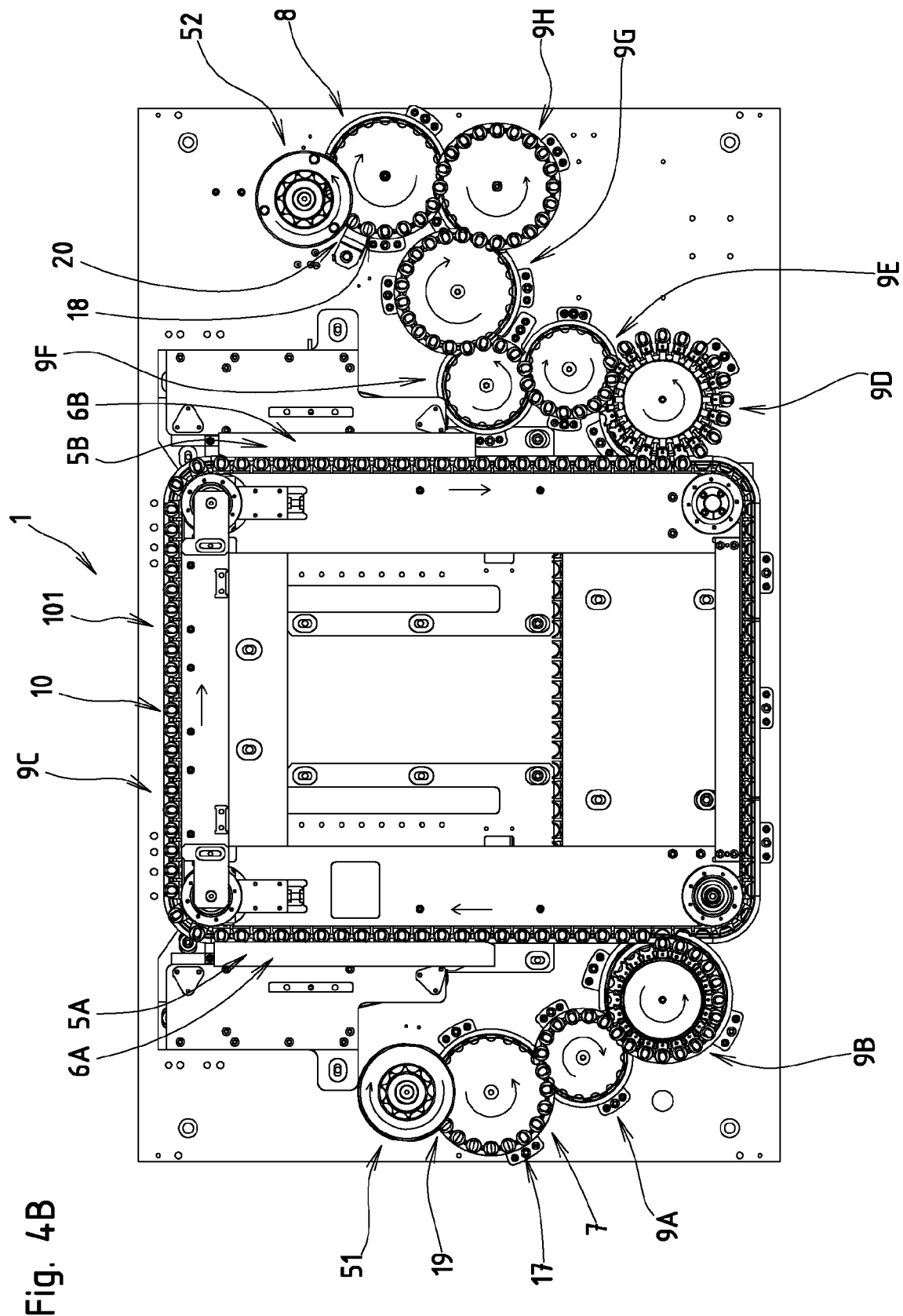

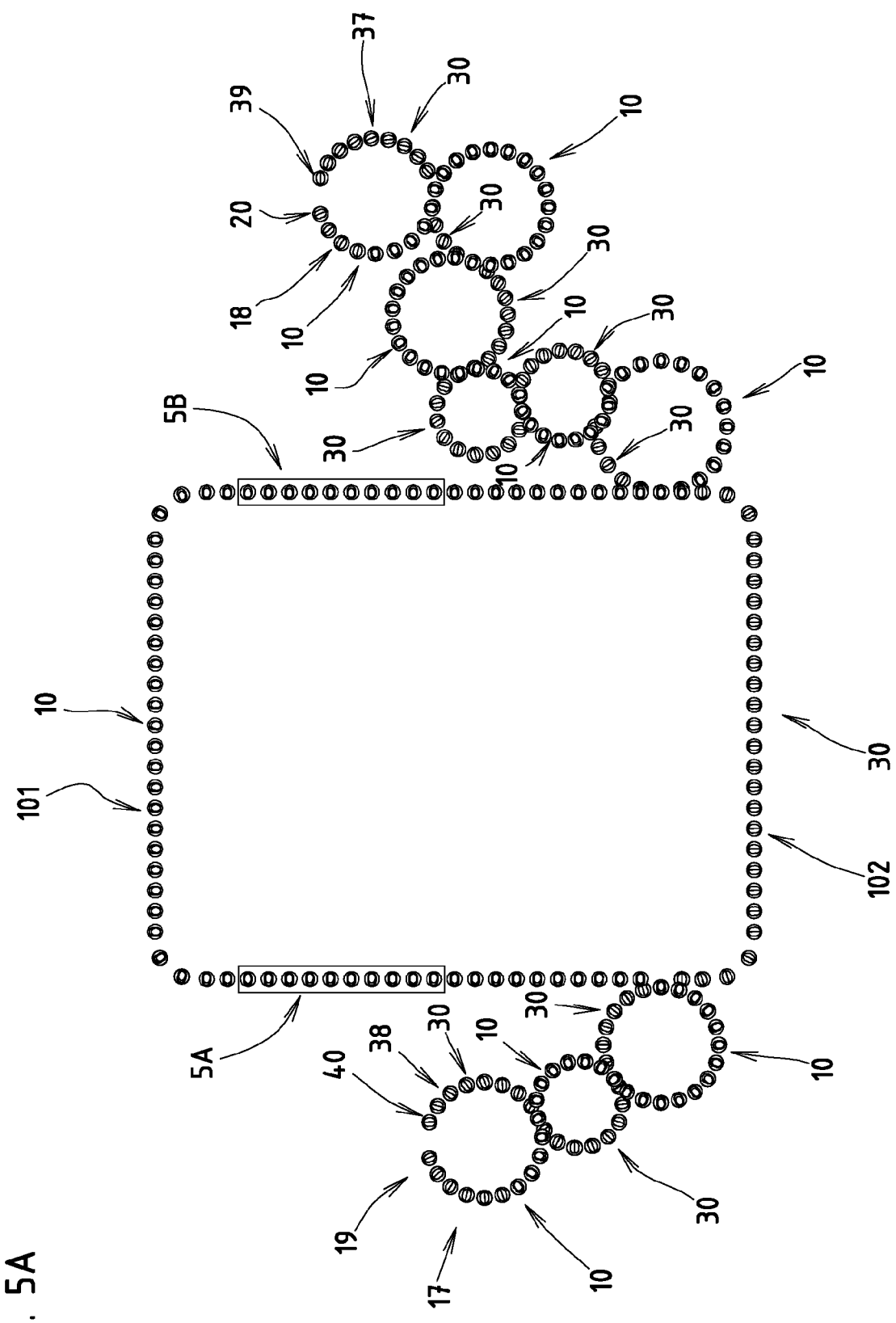

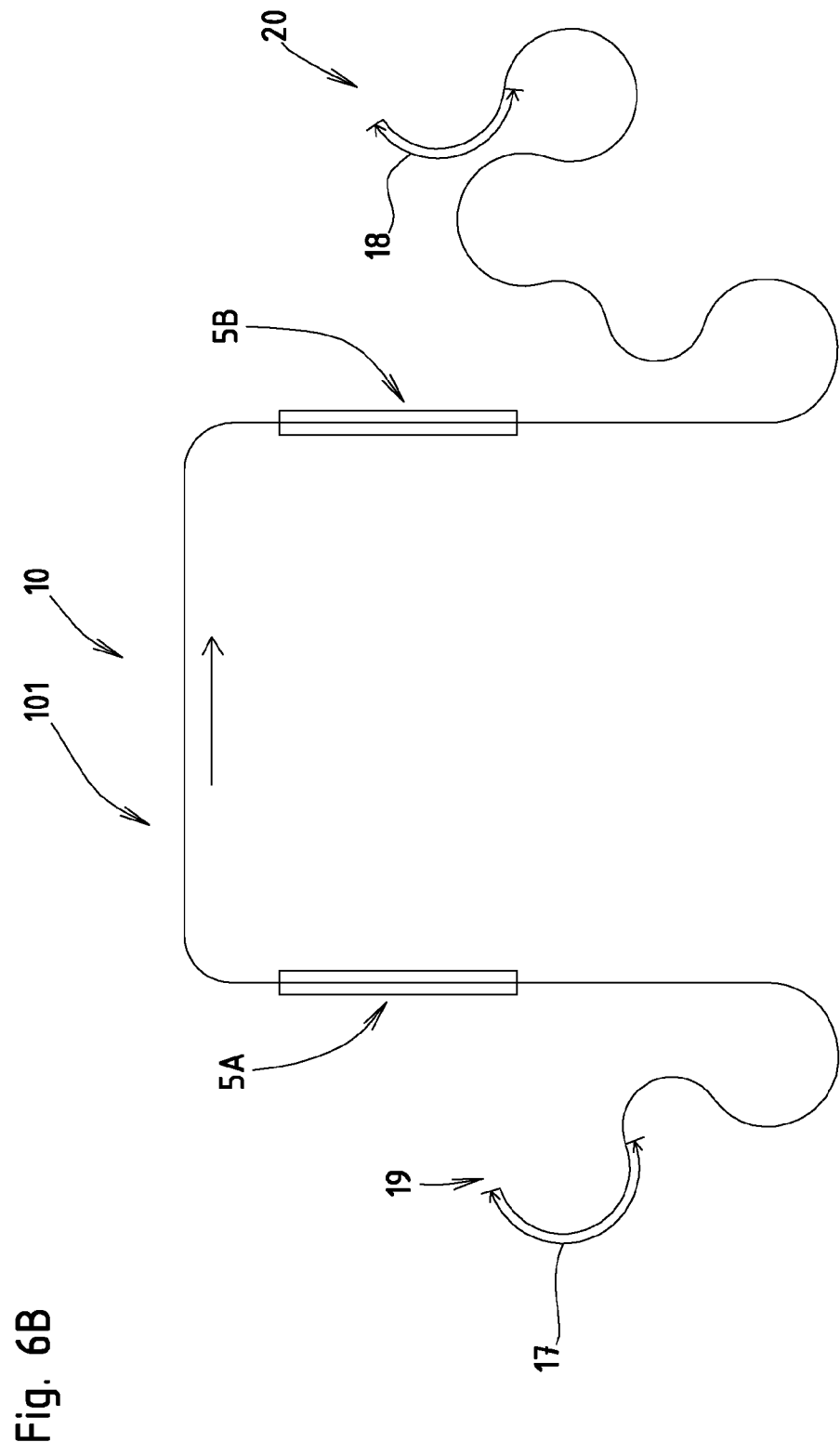

SYSTEM FOR PERFORMING A PROCESSING STEP ON DEVICE PARTS OF SIMULATED SMOKING DEVICES, SUCH AS ELECTRONIC CIGARETTES

FIELD OF THE INVENTION

The invention relates to a system for performing a processing step on device parts of simulated smoking devices, such as electronic cigarettes. The system comprises a processing station to perform the processing step on the device parts, product carriers to hold the device parts during the processing step, and a first transport device and a second transport device to move the product carriers along at least part of a processing trajectory extending through the processing station.

The processing station may for example be a weighing station to perform the processing step of weighing the device parts (and the product carriers) or a filling station to fill the device parts.

BACKGROUND OF THE INVENTION

The invention is based on the insight that in the known systems it is complicated to re-use the product carriers once they have travelled along the processing trajectory.

In some systems, the product carriers are collected at the end of the processing trajectory and manually transferred back to the start of the processing trajectory.

Other systems comprise additional transport devices having the sole purpose to automatically transfer the product carriers from the end of the processing trajectory to the start of the processing trajectory. These additional transfer device increase the complexity of the systems significantly.

SUMMARY OF THE INVENTION

The invention has the objective to provide an improved or at least alternative system for performing a processing step on device parts of simulated smoking devices, such as electronic cigarettes.

This objective is reached by a system for performing a processing step on device parts of simulated smoking devices, such as electronic cigarettes, said system comprising;
  a processing station to perform the processing step on the device parts,
  product carriers to hold the device parts during the processing step,
  a first transport device and a second transport device to move the product carriers along at least part of a processing trajectory extending through the processing station, wherein;
  the first transport device comprises multiple first production moving units for moving the product carriers, which first production moving units are positioned side by side while forming a first endless production configuration at a production level and are movable along a first endless production trajectory defined by the first endless production configuration,
  the second transport device comprises multiple second production moving units for moving the product carriers, which second production moving units are positioned side by side while forming a second endless production configuration at the production level and are movable along a second endless production trajectory defined by the second endless production configuration,
  said at least part of the processing trajectory is formed by a starting production part of the first endless production trajectory and an ending production part of the second endless production trajectory,
  the processing trajectory starts at a production start location located most upstream of the starting production part of the first endless production trajectory and ends at a production end location located most downstream of the ending production part of the second endless production trajectory,
  the first transport device and the second transport device are further configured to move the product carriers along at least part of a retrieval trajectory,
  the first transport device further comprises multiple first return moving units for moving the product carriers, which first return moving units are positioned side by side while forming a first endless return configuration at a return level located at a level distance from the production level and are movable along a first endless return trajectory defined by the first endless return configuration,
  the second transport device further comprises multiple second return moving units for moving the product carriers, which second return moving units are positioned side by side while forming a second endless return configuration at the return level and are movable along a second endless return trajectory defined by the second endless return configuration,
  said at least part of the retrieval trajectory is formed by a starting return part of the second endless return trajectory and an ending return part of the first endless return trajectory,
  the retrieval trajectory starts at a return start location located most upstream of the starting return part of the second endless return trajectory and ends at a return end location located most downstream of the ending return part of the first endless return trajectory,
  a first level device is provided to transfer the product carriers from the return end location to the production start location,
  a second level device is provided to transfer the product carriers from the production end location to the return start location,
  the first level device comprises a first level housing having a first inner helical level guide groove extending from the return level until the production level and a first level rotary member which is rotatable about a first level rotation axis,
  the first level rotary member comprises first level moving units to move the product carriers through the first level guide groove from the return level to the production level,
  the second level device comprises a second level housing having a second inner helical level guide groove extending from the production level until the return level and a second level rotary member which is rotatable about a second level rotation axis, and
  the second level rotary member comprises second level moving units to move the product carriers through the second level guide groove from the production level to the return level.

This system allows that the first and second transport devices are not only used to transfer the product carriers along the production trajectory, but also assist in transferring the product carriers from the end of the processing trajectory (the production start location) back to the start of the processing trajectory (production end location). This way an efficient automatic transfer of the product carriers from the end of the processing trajectory back to the start of the processing trajectory is achieved. In addition, the construction of the system is kept relatively simple.

In an embodiment of the system, a first production support rail is provided to support the product carriers when moving along the starting production part of the processing trajectory, a first return support rail is provided to support the product carriers when moving along the ending return part of the retrieval trajectory, a second production support rail is provided to support the product carriers when moving along the ending production part of the processing trajectory, a second return support rail is provided to support the product carriers when moving along the starting return part of the retrieval trajectory, the first production support rail aligns with the first level guide groove at the production level, the first return support rail aligns with the first level guide groove at the return level, the second production support rail aligns with the second level guide groove at the production level, and the second return support rail aligns with the second level guide groove at the return level.

In an embodiment of the system, the first production moving units are provided in a first production rotary member which is rotatable around a first transport rotation axis, the first return moving units are provided in a first return rotary member which is rotatable around the first transport rotation axis, the second production moving units are provided in a second production rotary member which is rotatable around a second transport rotation axis, and the second return moving units are provided in a second return rotary member which is rotatable around the second transport rotation axis.

In an embodiment of the system, the first level moving units extend from the return level until the production level and the second level moving units extend from the production level until the return level.

In an embodiment of the system, the first and second level rotary members are configured to move the product carriers around the first and second level rotation axes and to allow the product carriers to move in vertical direction within the first and second level moving units, and the first and second level guide grooves are configured to move the product carriers in vertical direction within the first and second level moving units.

In an embodiment of the system, the first helical level guide groove extends around the first level rotary member, more specifically around the first level moving units, and the second helical level guide groove extends around the second level rotary member, more specifically around the second level moving units.

In an embodiment of the system, the first level rotary member is configured to slide the product carriers through the first level guide groove from the return level to the production level, and the second level rotary is configured to slide the product carriers through the second level guide groove from the production level to the return level.

In an embodiment of the system, the first level guide groove and the second level guide groove are stationary.

In an embodiment of the system, the first level device transfers the product carriers from the return level to the production level and the second level device transfers the product carriers from the production level to the return level.

In an embodiment of the system, the first transport device moves the first production moving units and the first return moving units synchronously, and the second transport device moves the second production moving units and the second return moving units synchronously.

In an embodiment of the system, a first transporter driver is provided to move the first production moving units along the first endless production trajectory and the first return moving units along the first endless return trajectory, and a second transporter driver is provided to move the second production moving units along the second endless production trajectory and the second return moving units along the second endless return trajectory.

In an embodiment of the system, a first level driver is provided to rotate the first level rotary member in the first level housing, and a second level driver is provided to rotate the second level rotary member in the second level housing.

In an embodiment of the system, the first level driver is mechanically coupled to the first transporter driver and the second level driver is mechanically coupled to the second transporter driver.

In an embodiment of the system, the first transport device and the second transport device are configured to transfer the product carriers at the production level from the first transport device to the second transport device and at the return level from the second transport device to the first transport device.

In an embodiment of the system, the first transport device and the second transport device are configured to transfer the product carriers at the production level from the first transport device directly to the second transport device and at the return level from the second transport device directly to the first transport device.

In an embodiment of the system, the first transport device and the second transport move the product carriers along the complete processing trajectory and the complete retrieval trajectory.

In an embodiment of the system, the first transport device and the second transport device are configured to transfer the product carriers at the production level from the first transport device indirectly to the second transport device and at the return level from the second transport device indirectly to the first transport device.

In an embodiment of the system, the first transport device and the second transport device move the product carriers along part of the processing trajectory and part of the retrieval trajectory, and the product carriers are at the processing level and the retrieval level transferred between the first transport device and the second transport device by at least one further transport device.

In an embodiment of the system, each product carrier comprises a longitudinal axis and the first transport device and the second transport device move the product carriers while maintaining their longitudinal axes in a vertical position.

In an embodiment of the system, the first level device and the second level device move the product carriers while maintaining their longitudinal axes in the vertical position.

In an embodiment of the system, the product carriers hold the device parts in a predetermined orientation relative to the product carriers.

In an embodiment of the system, the product carriers hold the device parts in a upright position relative to the transport devices, more specifically the first transport device, the second transport device and—if present—the further transport device(s).

In an embodiment of the system, the first production moving units are positioned side by side at a first production distance from each other, the second production moving units are positioned side by side at a second production distance from each other, the first return moving units are positioned side by side at a first return distance from each other, and the second return moving units are positioned side by side at a second return distance from each other.

In an embodiment of the system, the first production distance is equal to the first return distance and the second production distance is equal to the second return distance.

In an embodiment of the system, the level distance is measured in a vertical direction.

In an embodiment of the system, the product carriers are positioned below the device parts to support the device parts.

BRIEF DESCRIPTION OF THE INVENTION

Figure 2:
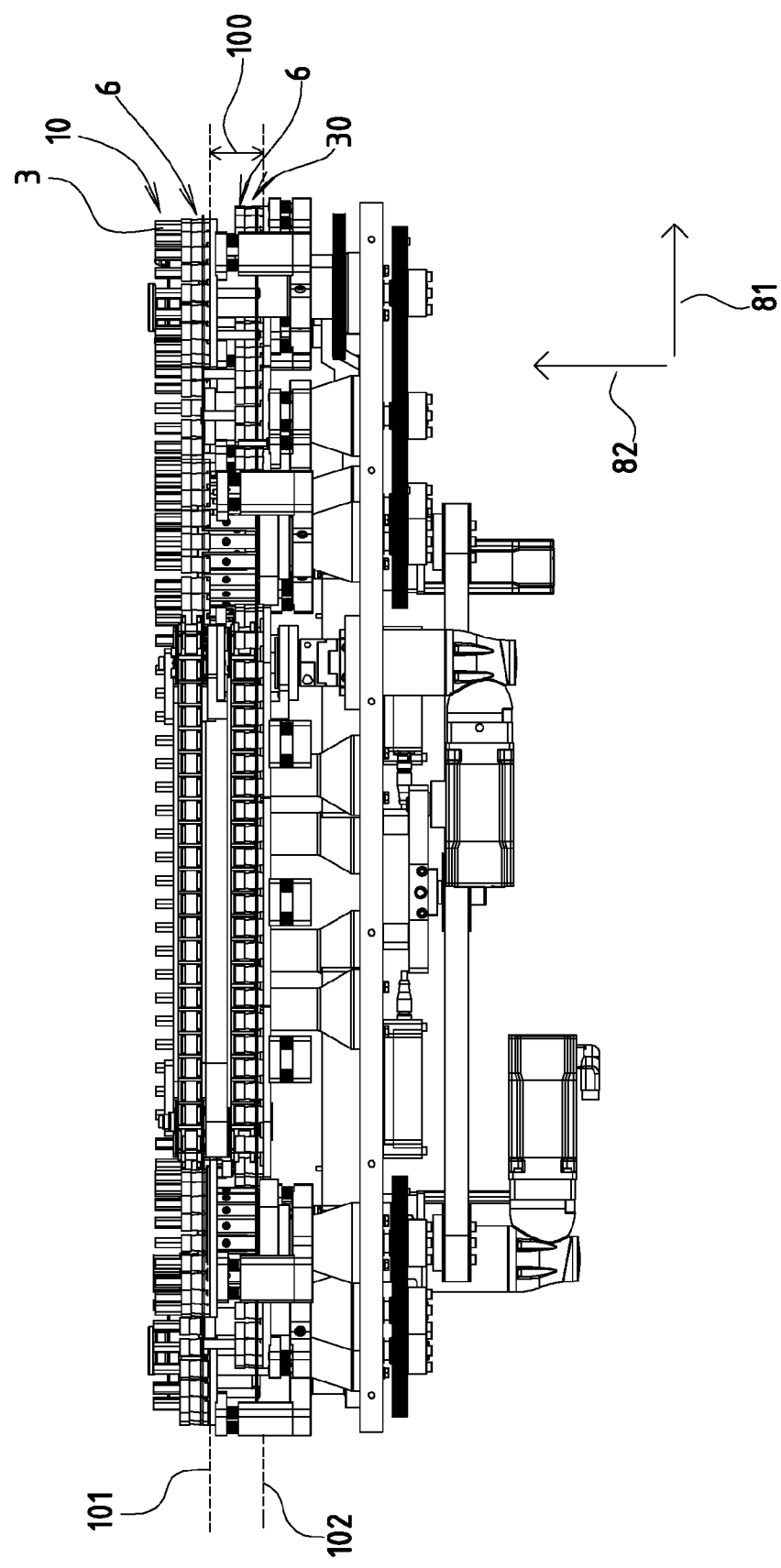
Figure 3:
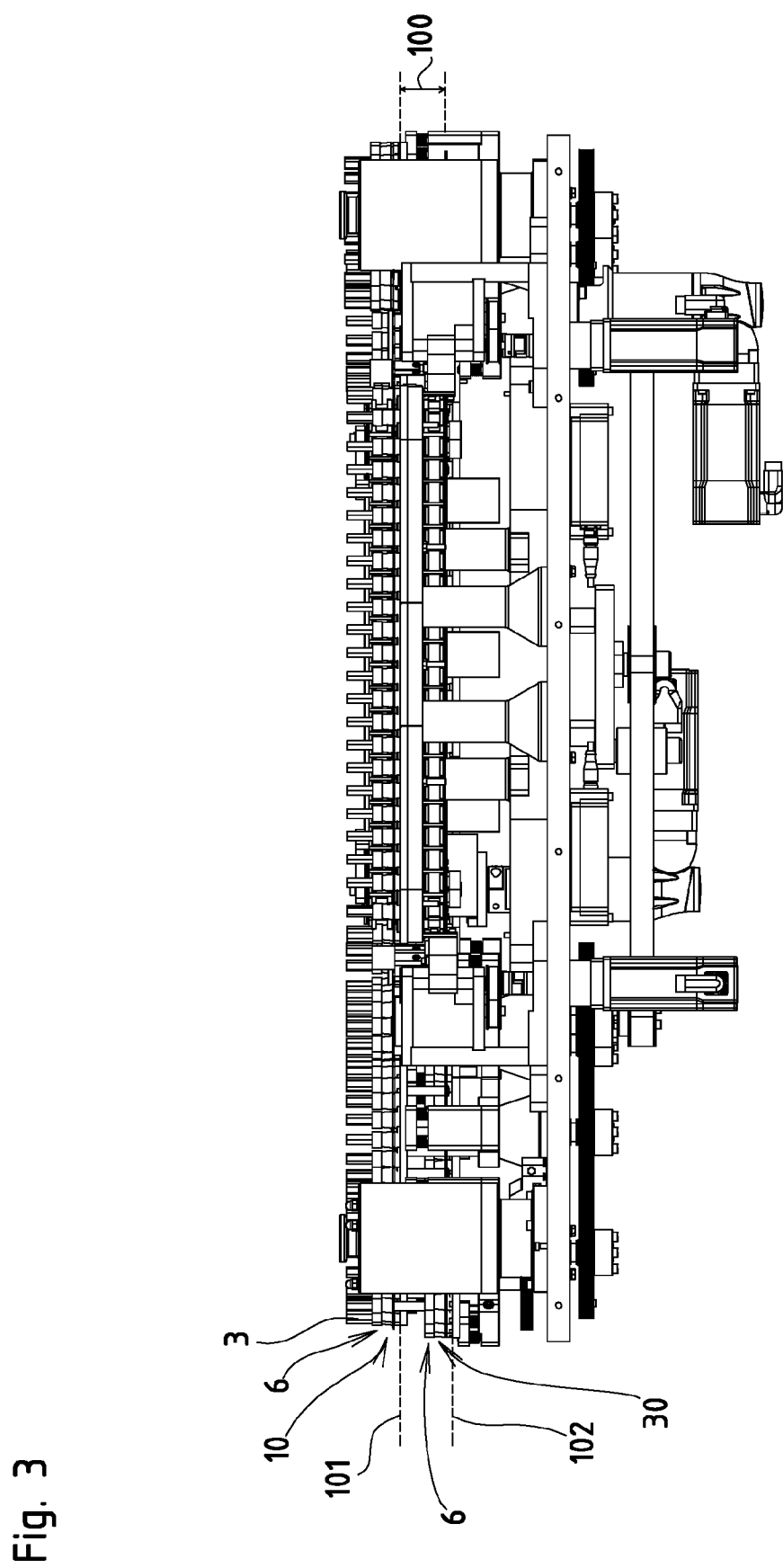
Figure 4A:
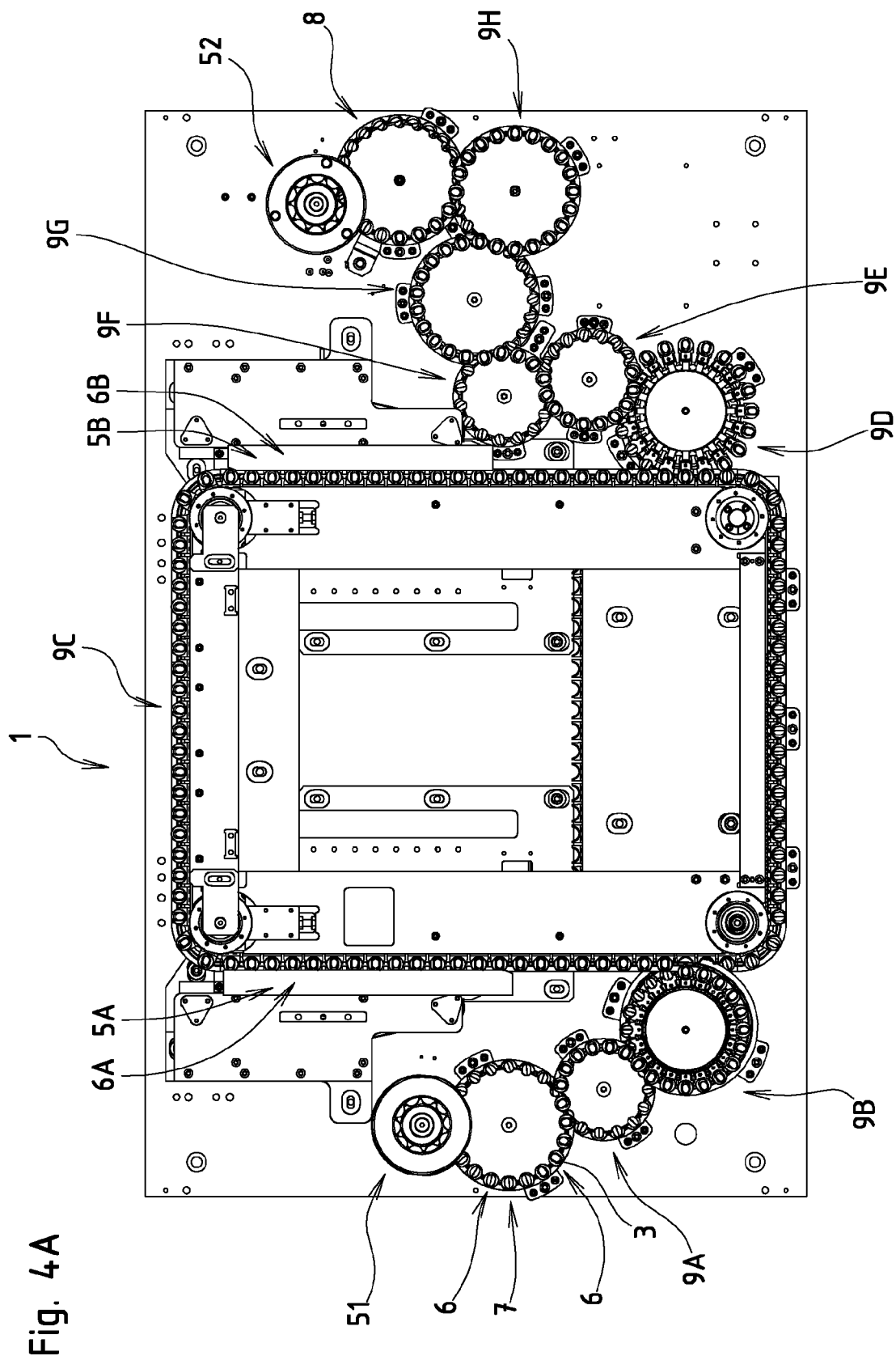
Figure 4C:
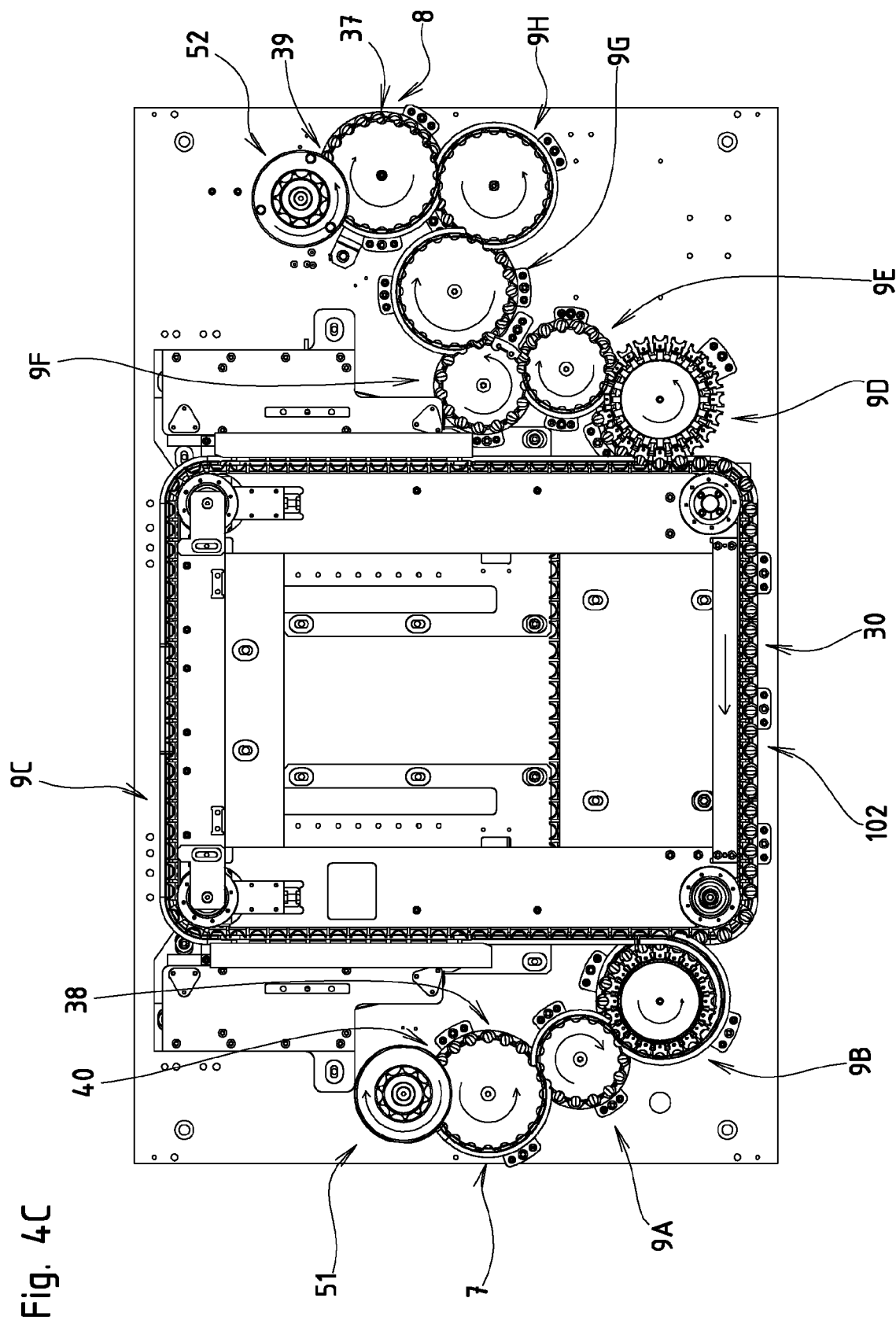
Figure 5B:
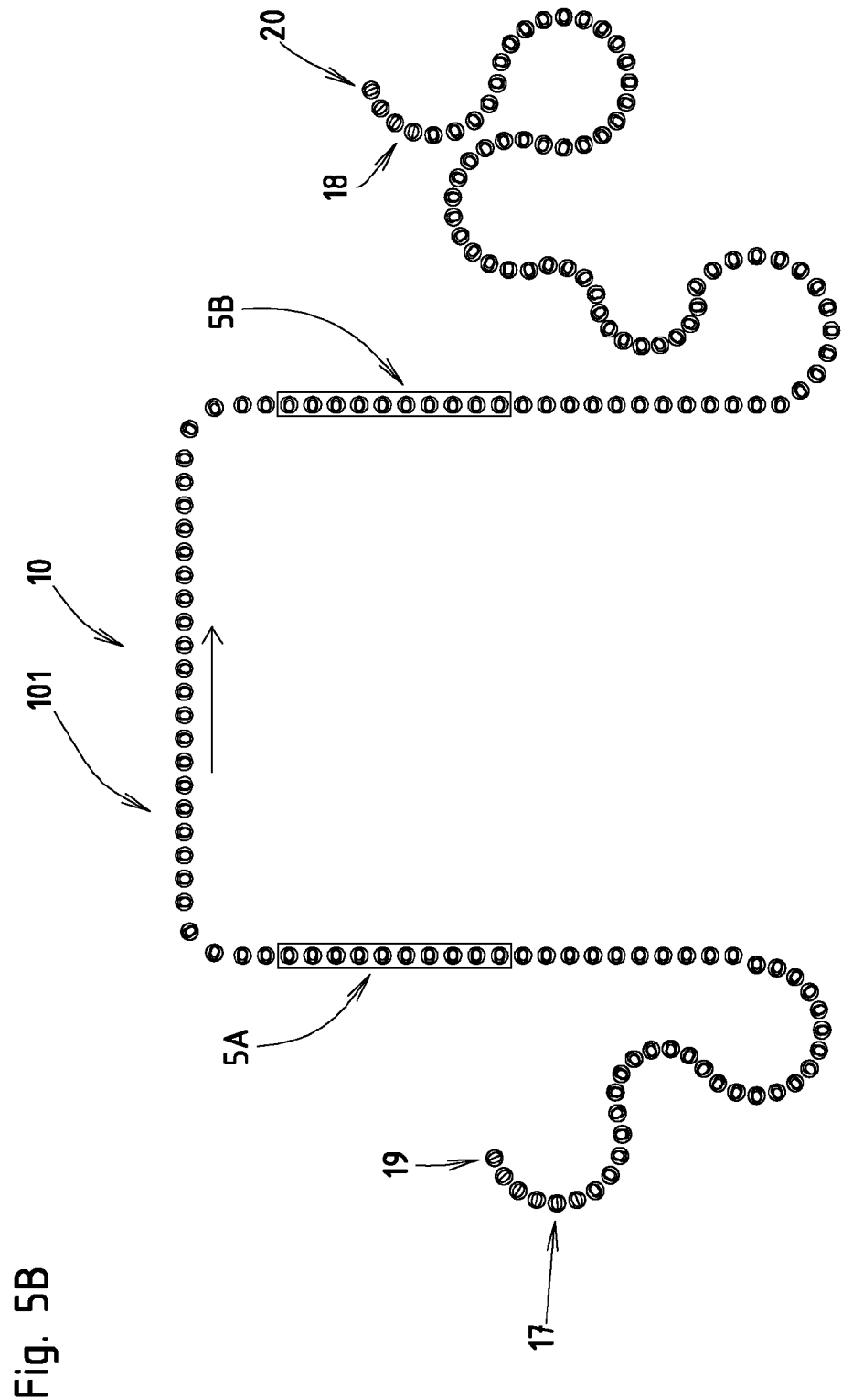
Figure 5C:
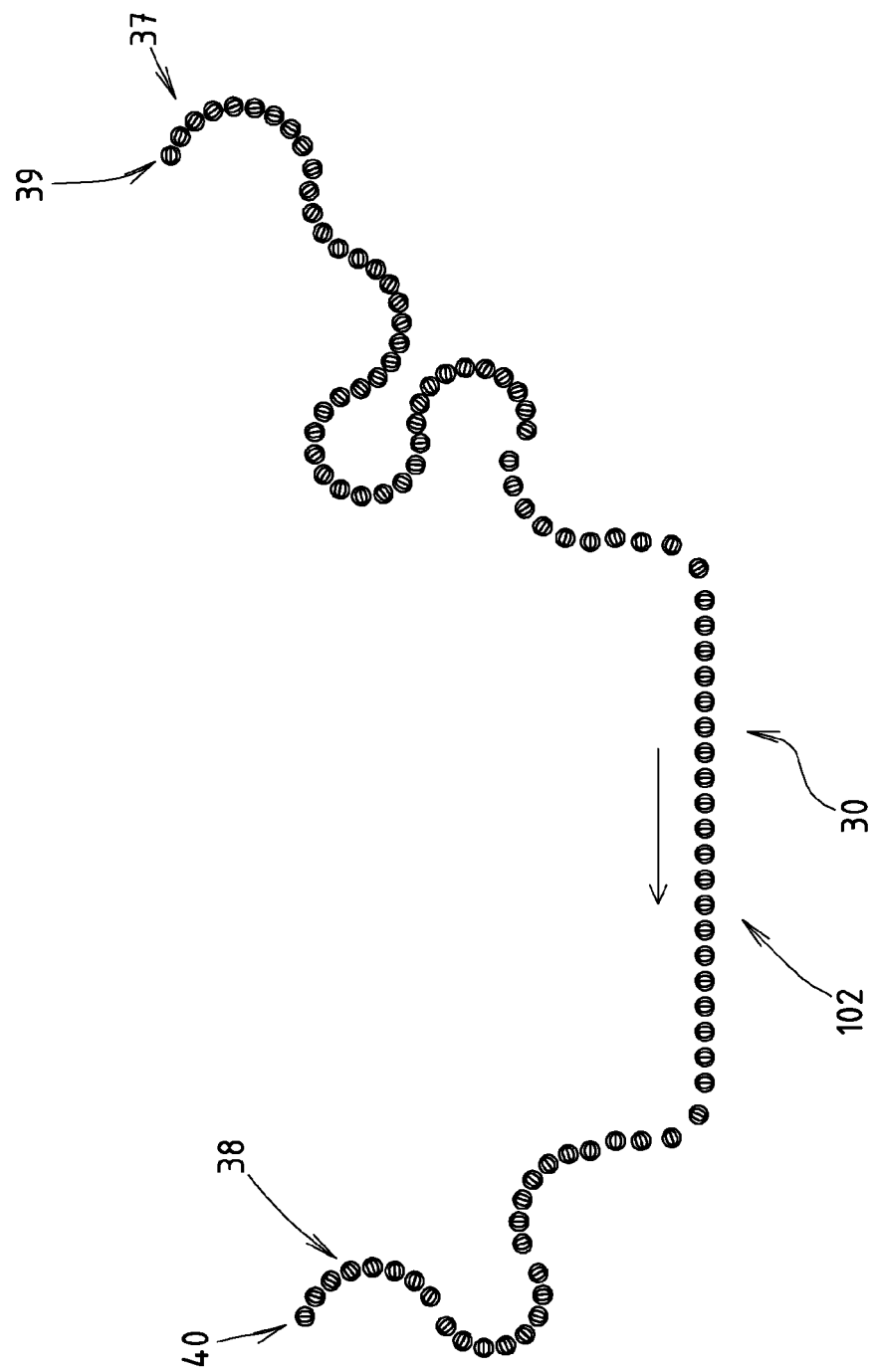
Figure 6A:
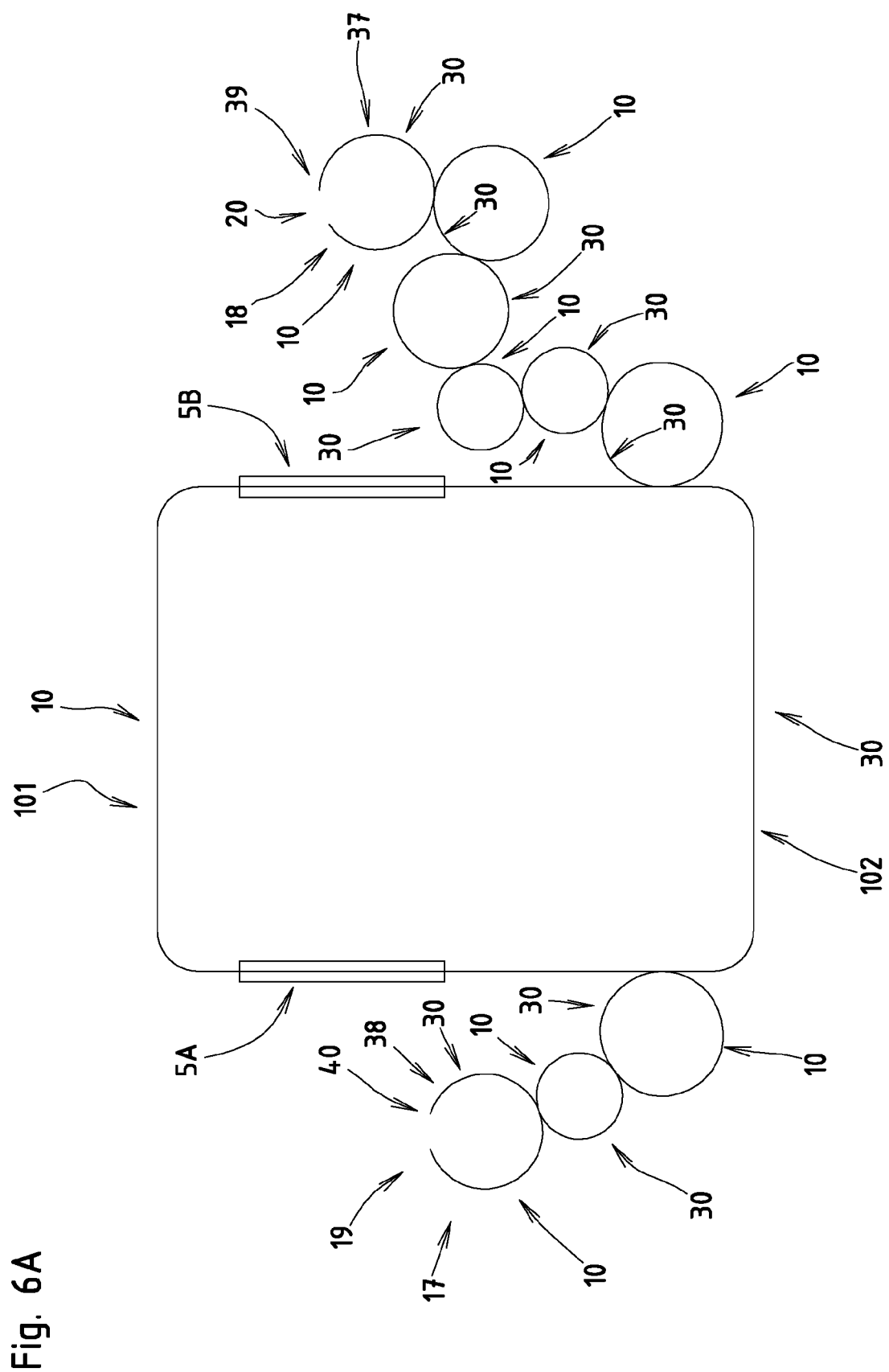
Figure 6C:
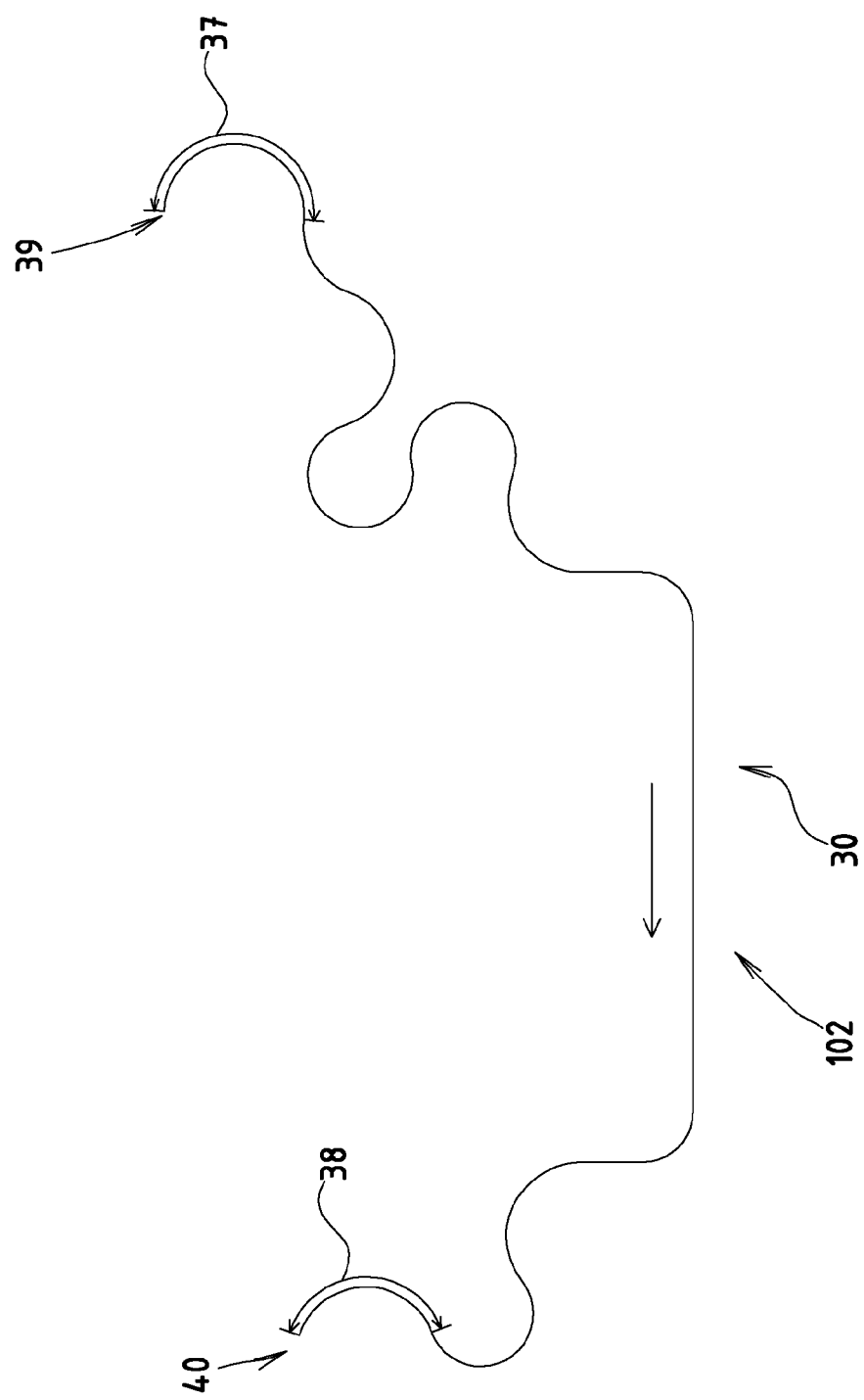
Figure 7A:
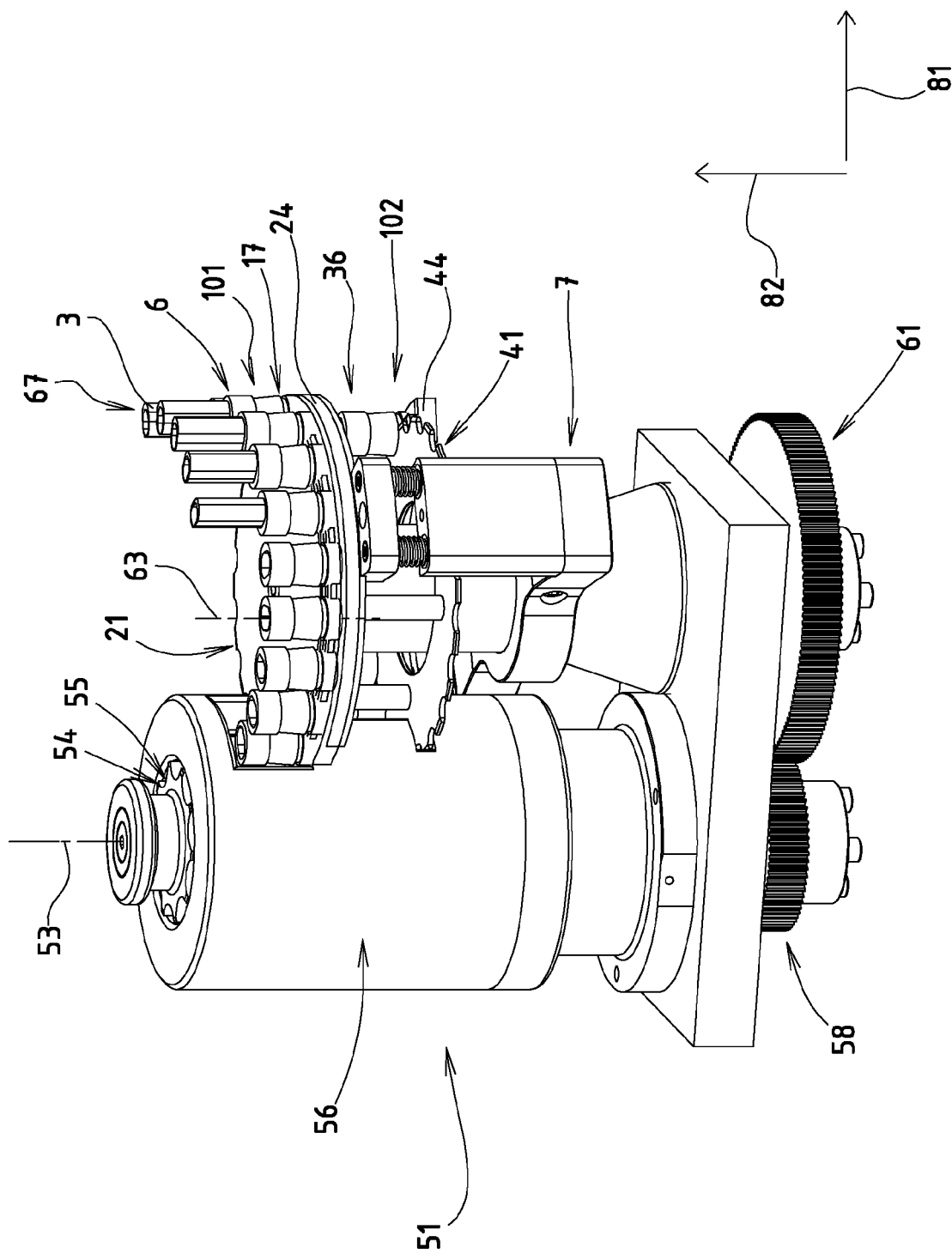
Figure 7B:
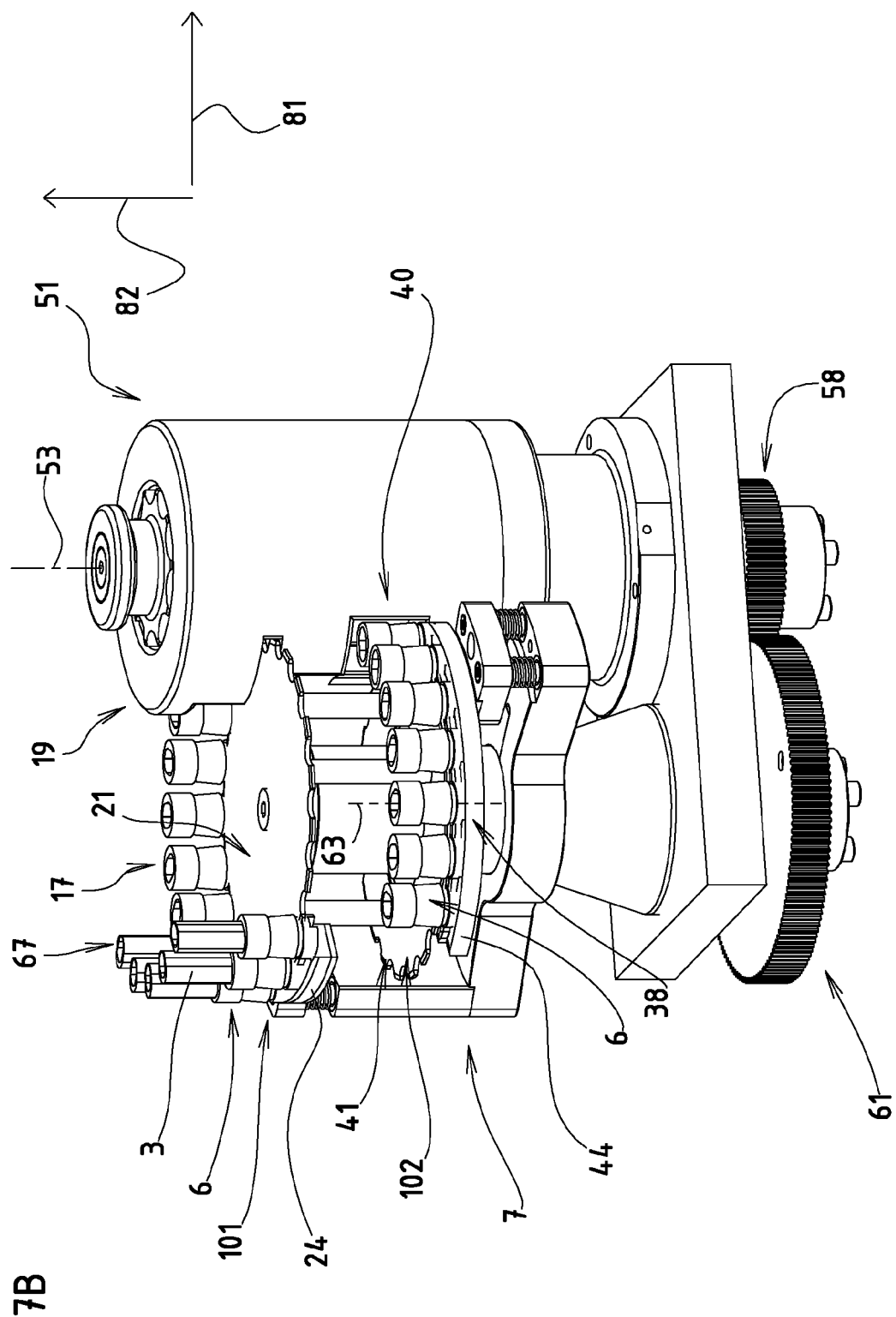
Figure 8A:
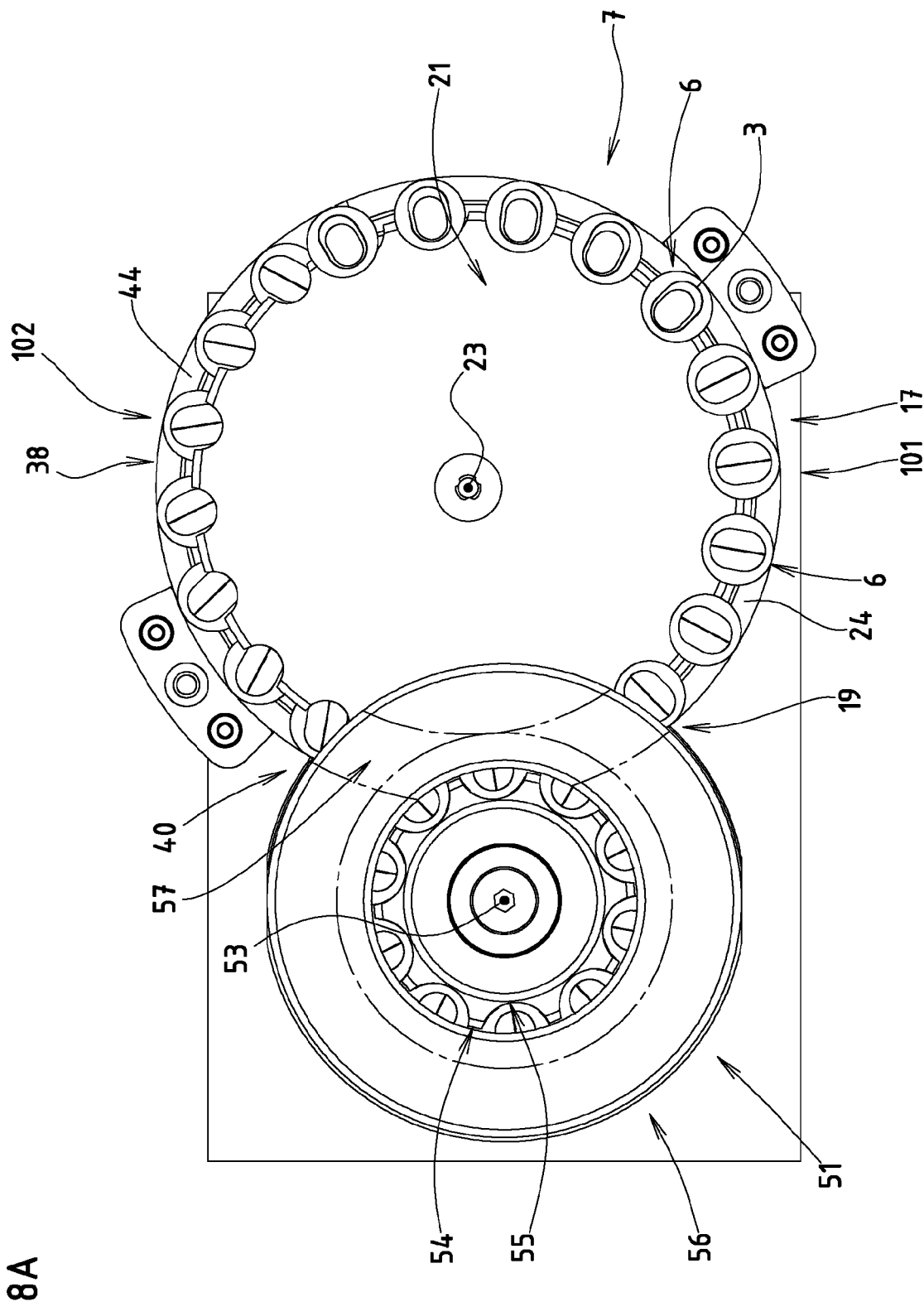
Figure 8B:
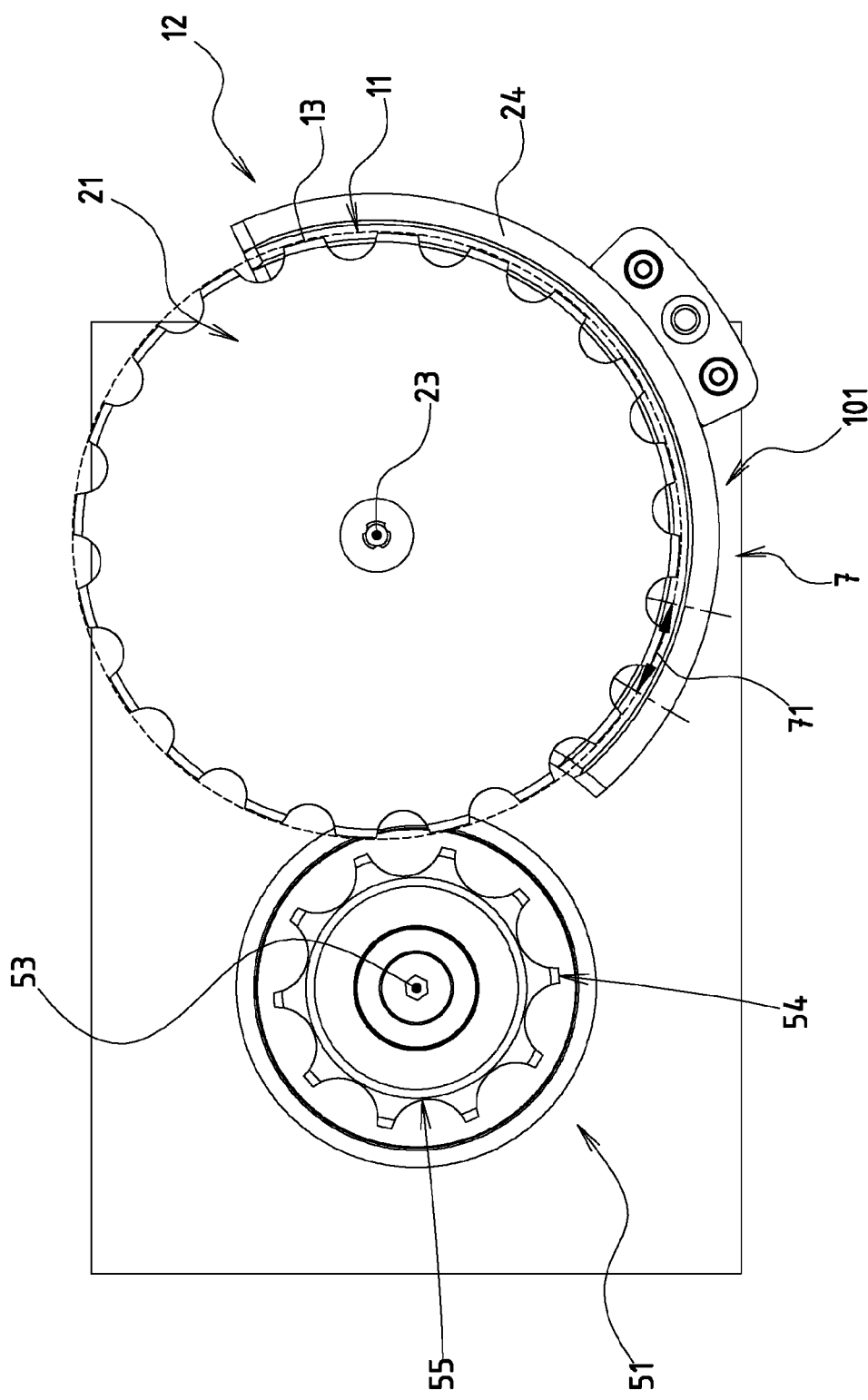
Figure 8C:
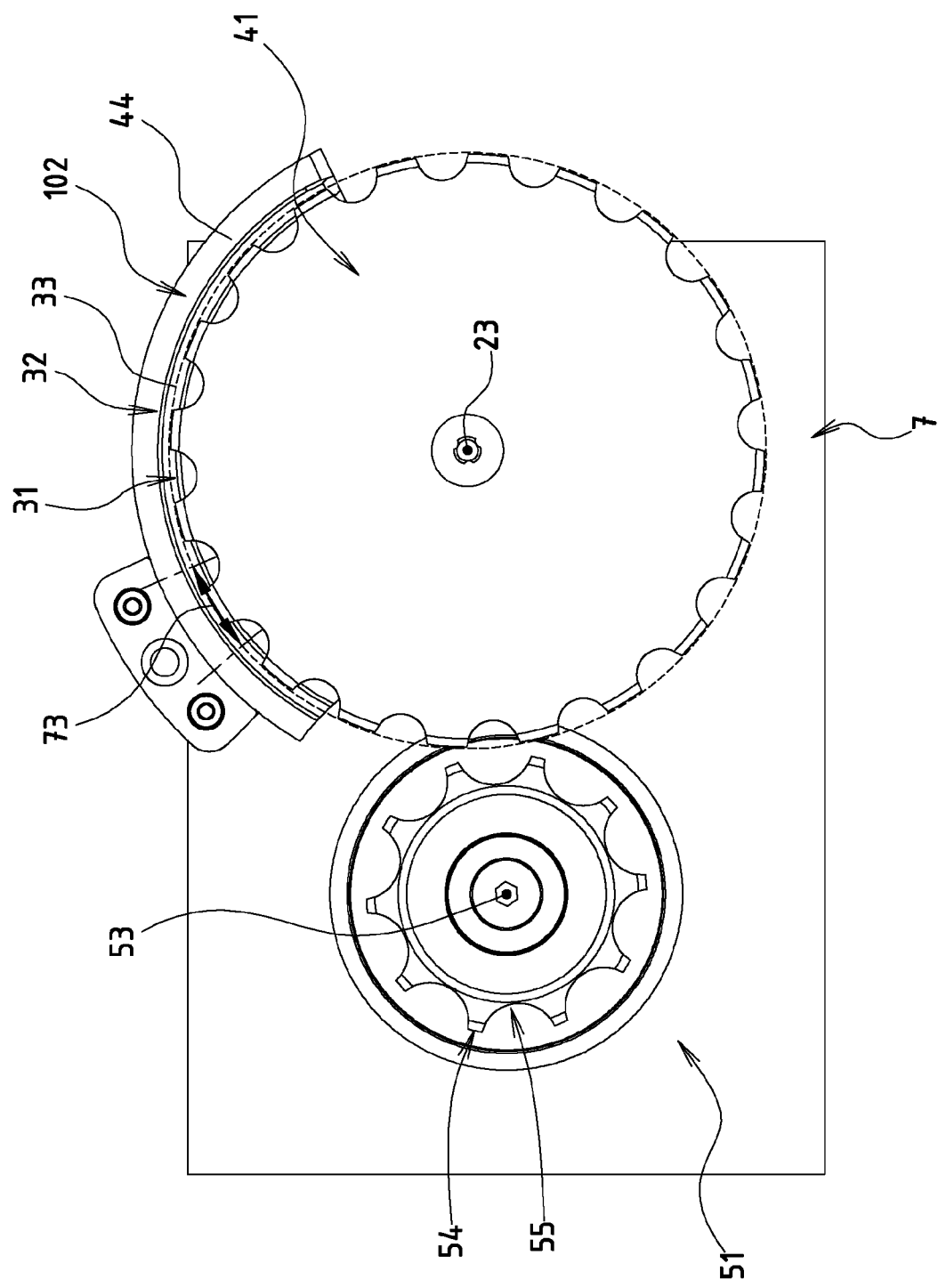
Figure 9A:
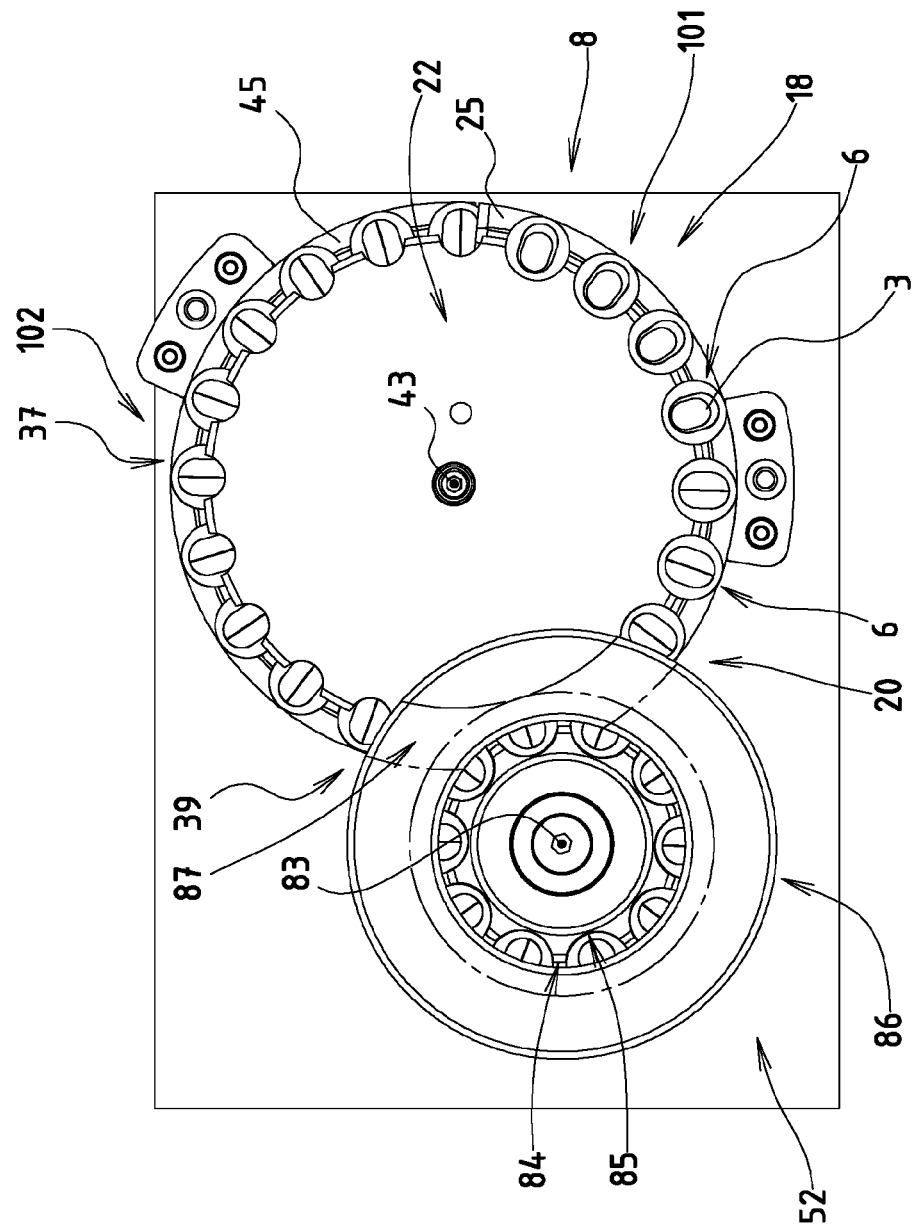
Figure 9B:
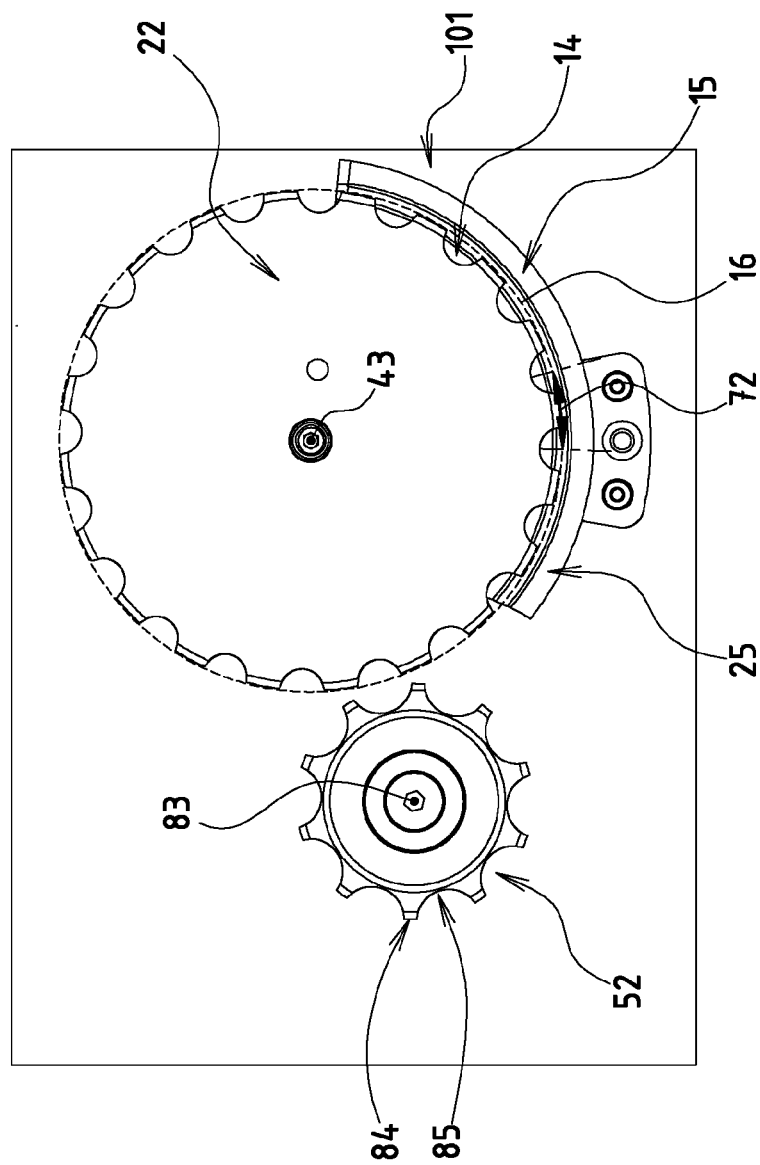
Figure 9C:
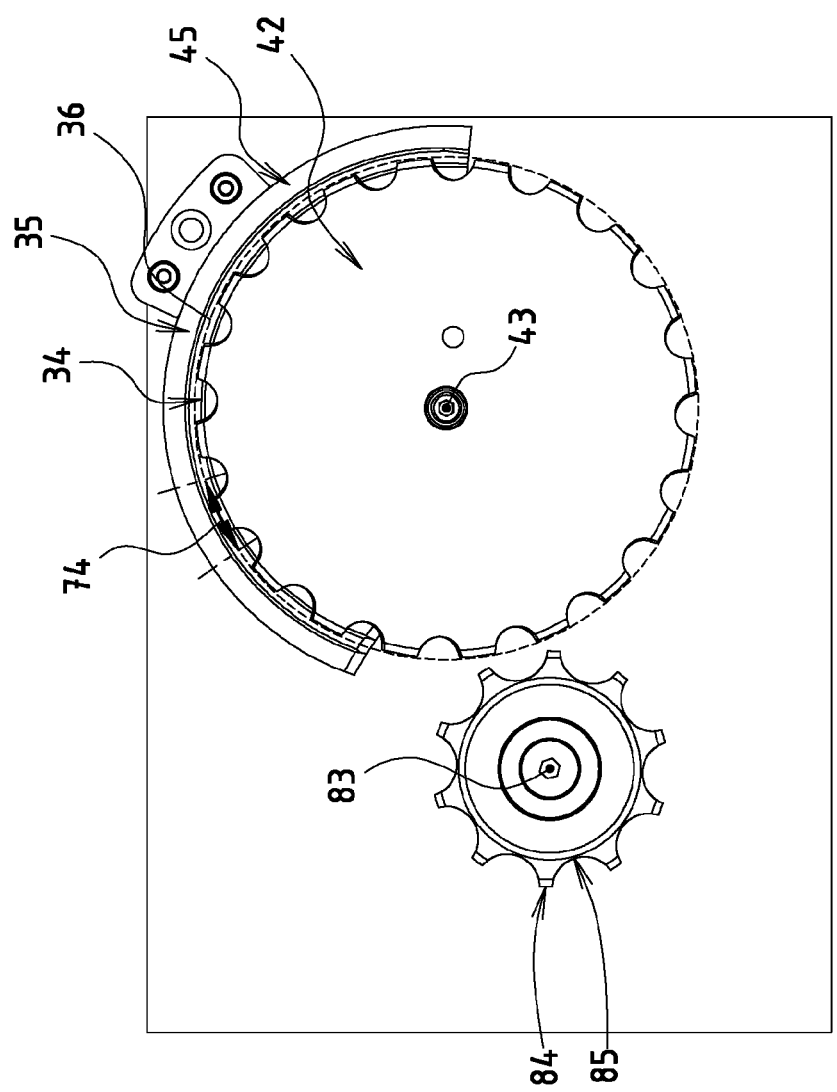
Figure 10A:
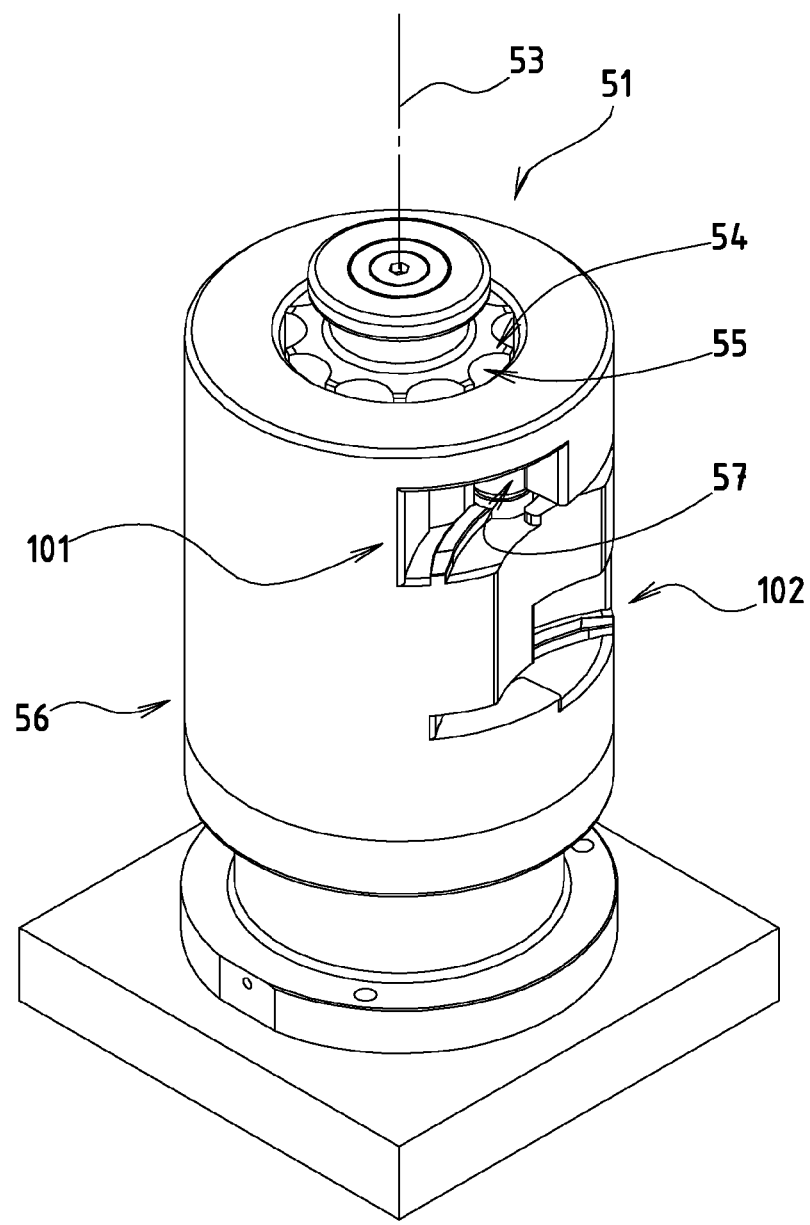
Figure 10B:
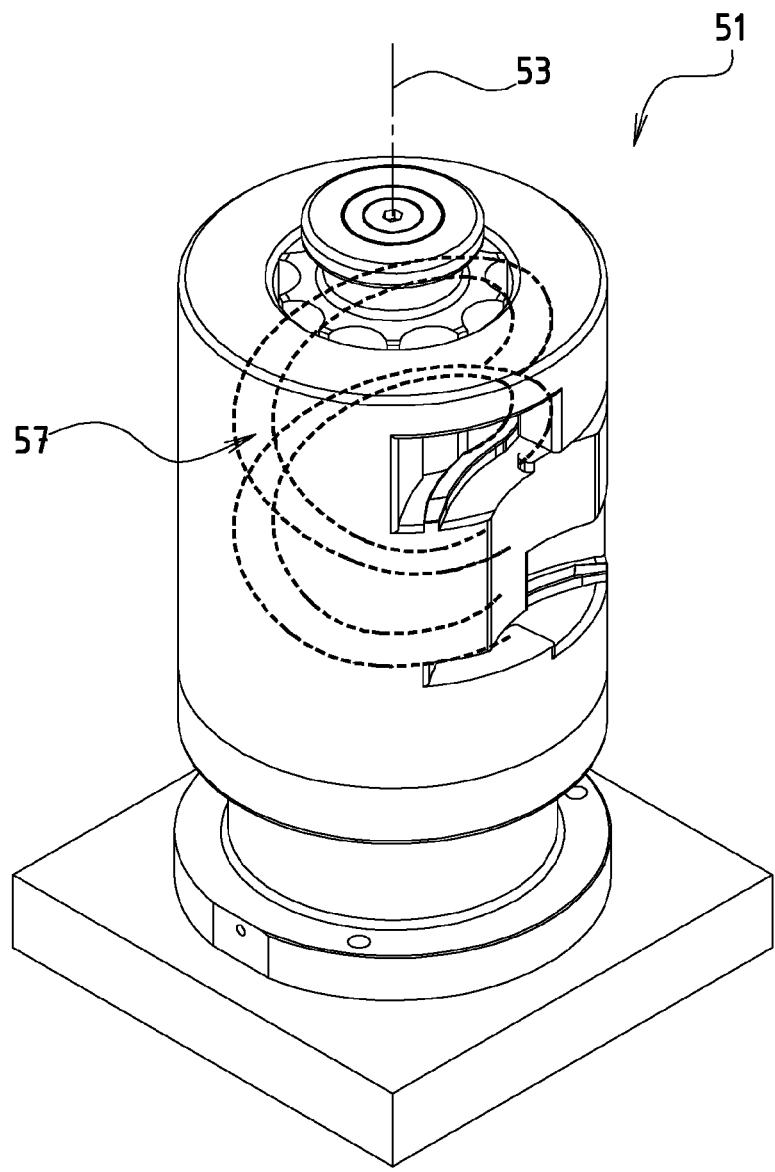
Figure 10C:
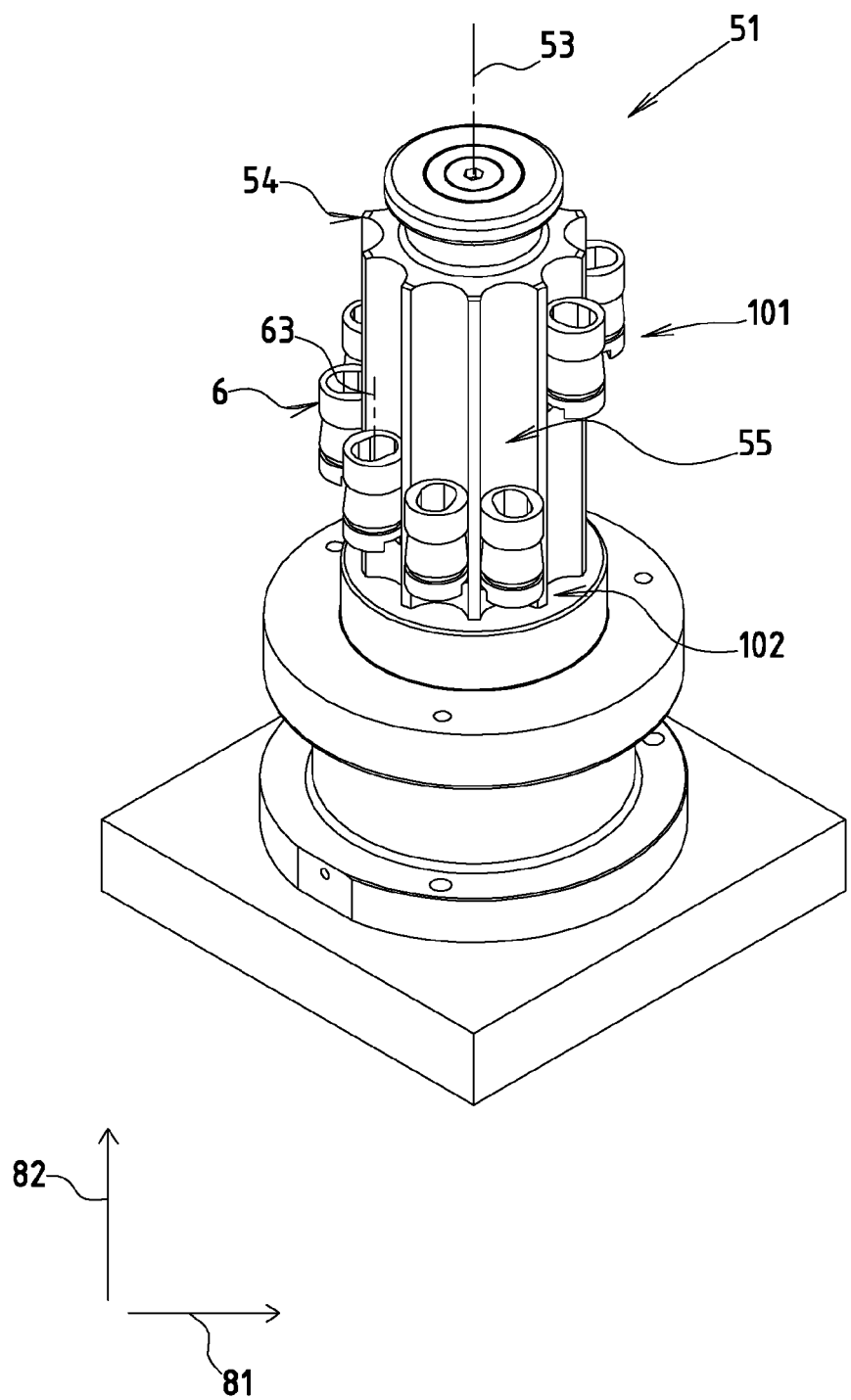
Figure 11:
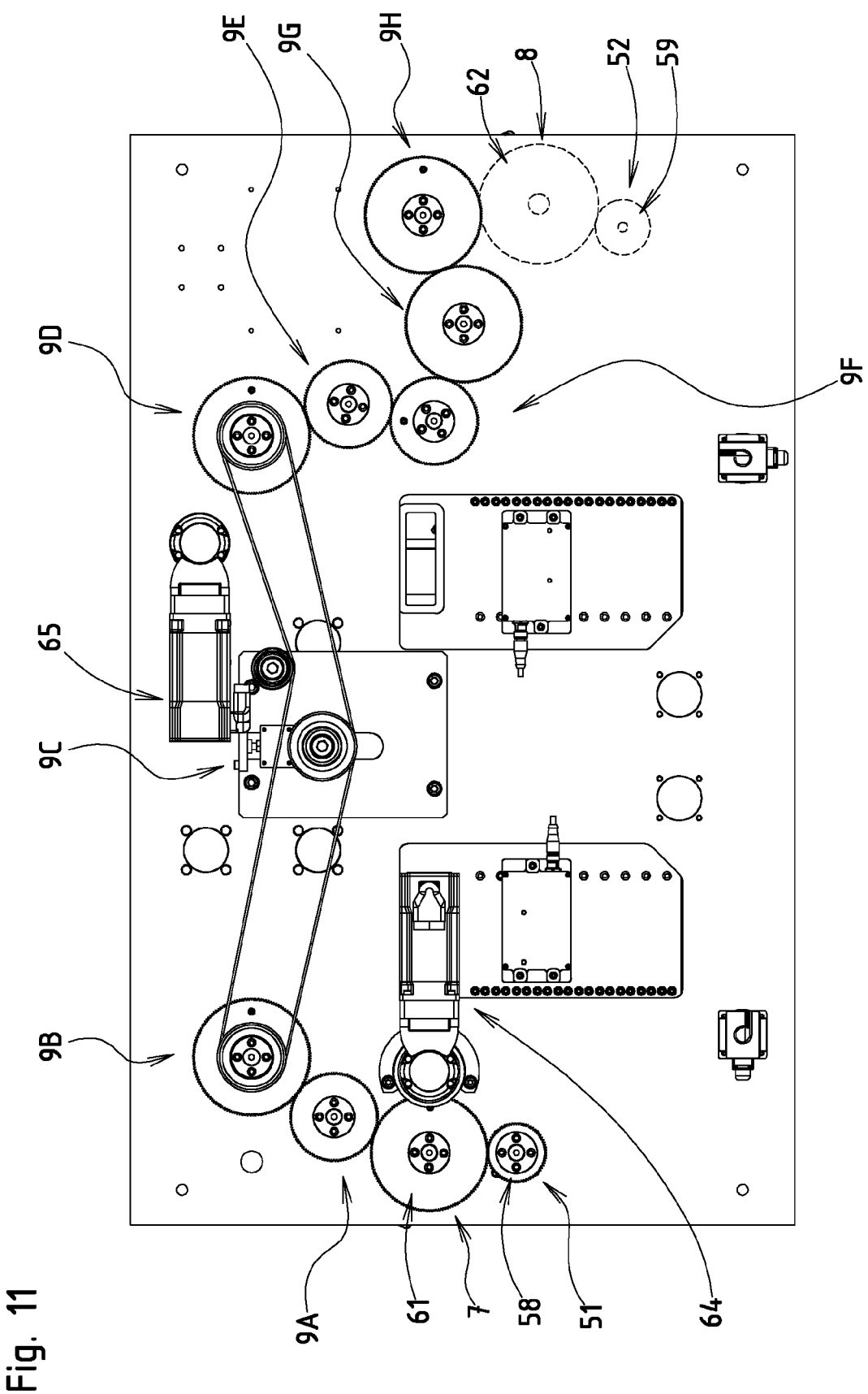

Embodiments of the system according to the invention will be described by way of example only, with reference to the accompanying schematic drawings in which corresponding reference symbols indicate corresponding parts, and in which:

FIG. 1 schematically shows a view in perspective of an embodiment of the system according to the invention, FIG. 2 schematically shows a side view in the direction of arrow II of FIG. 1, FIG. 3 schematically shows a side view in the direction of arrow III of FIG. 1, the FIG. 4A-C schematically show top views of the system of FIG. 1, the FIG. 5A-C schematically show top views of the product carriers of the system of FIG. 1, the FIG. 6A-C schematically show top views of the processing trajectory and the retrieval trajectory of the product carriers of the system of FIG. 1, the FIGS. 7A-B schematically show views in perspective of the first transport device of the system of FIG. 1, the FIGS. 8A-C schematically show top views the first transport device of FIG. 7, the FIGS. 9A-C schematically show top views of the second transport device of the system of FIG. 1, the FIGS. 10A-C schematically show views in perspective of the first level device of the system of FIG. 1, and FIG. 11 schematically shows a bottom view of the system of FIG. 1.

DETAILED DESCRIPTION OF THE DRAWINGS

FIG. 1 shows a view in perspective of an embodiment of the system 1 for performing a processing step on device parts 3 of simulated smoking devices, such as electronic cigarettes. The FIGS. 2 and 3 show side views in the direction of the arrows II and III of FIG. 1, respectively.

The system 1 comprises a processing station 5A to perform the processing step on the device parts 3. The system 1 comprises product carriers 6 to hold the device parts 3 during the processing step, and a first transport device 7 and a second transport device 8 to move the product carriers 6 along at least part of a processing trajectory 10 extending through the processing station 5A. The processing trajectory 10 is (implicitly or explicitly) shown in the FIGS. 4B, 5B and 6B.

The device parts 3 are placed in the product carriers 6 by an insert device 91 during movement by the first transport device 7 and removed from the product carriers 6 by a removal device 92 during movement by the second transport device 8.

The processing station 5A is a weighing station 4A to perform the processing step of weighing the device parts 3 together with the product carriers 6. In this embodiment, the system 1 comprises a further processing station 5B. More specifically, the system 1 comprises a further weighing station 4B to perform a further processing step of weighing the device parts 3 together with the product carriers 6 for the second time.

In the shown embodiment of the system 1, the first transport device 7 and the second transport device 8 move the product carriers 6 along part of the processing trajectory 10. The product carriers 6 are moved along the remaining part of the processing trajectory 10 by eight further transport devices 9A-H. Said further transport devices 9A-H transfer the product carriers 6 between the first and second transport devices 7 and 8.

In an alternative embodiment of the system 1 (not shown), the first transport device 7 and the second transport device 8 move the product carriers 6 along the complete processing trajectory 10.

The first transport device 7 is shown more in detail in the FIGS. 7A-B and 8A-C. The first transport device 7 comprises multiple first production moving units 11 (see FIG. 8B) for moving the product carriers 6, which first production moving units 11 are positioned side by side while forming a first endless production configuration 12 at a production level 101 (see the FIGS. 2 and 3) and are movable along a first endless production trajectory 13 defined by the first endless production configuration 12.

The second transport device 8 is shown more in detail in the FIGS. 9A-C. The second transport device 8 comprises multiple second production moving units 14 (see FIG. 9B) for moving the product carriers 6, which second production moving units 14 are positioned side by side while forming a second endless production configuration 15 at the production level 101 and are movable along a second endless production trajectory 16 defined by the second endless production configuration 15.

Said at least part of the processing trajectory 10 along which the product carriers 6 are moved by the first and second transport devices 7 and 8 is formed by a starting production part 17 of the first endless production trajectory 13 and an ending production part 18 of the second endless production trajectory 16 (see the FIGS. 6B and 9B).

The processing trajectory 10 starts at a production start location 19 located most upstream of the starting production part 17 of the first endless production trajectory 13 and ends at a production end location 20 located most downstream of the ending production part 18 of the second endless production trajectory 16.

The first transport device 7 and the second transport device 8 are further configured to move the product carriers 6 along at least part of a retrieval trajectory 30. The retrieval trajectory 30 is (implicitly or explicitly) shown in the FIGS. 4C, 5C and 6C.

The first transport device 7 further comprises multiple first return moving units 31 (see FIG. 8C) for moving the product carriers 6, which first return moving units 31 are positioned side by side while forming a first endless return configuration 32 at a return level 102 (see the FIGS. 2 and 3) located at a level distance 100 from the production level 101 and are movable along a first endless return trajectory 33 defined by the first endless return configuration 32. The level distance is measured in a vertical direction 82. The horizontal direction 81 and vertical direction 82 are indicated in the FIGS. 2 and 7.

The second transport device 8 further comprises multiple second return moving units 34 (see FIG. 9C) for moving the product carriers 6, which second return moving units 34 are positioned side by side while forming a second endless return configuration 35 at the return level 102 and are movable along a second endless return trajectory 36 defined by the second endless return configuration 35.

Said at least part of the retrieval trajectory 30 along which the product carriers 6 are moved by the first and second transport devices 7 and 8 is formed by a starting return part 37 of the second endless return trajectory 36 and an ending return part 38 of the first endless return trajectory 33 (see the FIGS. 4B, 5B and 6B).

The retrieval trajectory 30 starts at a return start location 39 located most upstream of the starting return part 37 of the second endless return trajectory 36 and ends at a return end location 40 located most downstream of the ending return part 38 of the first endless return trajectory 33.

A first level device 51 (see the FIGS. 10A-C) is provided to transfer the product carriers 6 from the return end location 40 to the production start location 19, and a second level device 52 is provided to transfer the product carriers 6 from the production end location 20 to the return start location 39. More specifically, the first level device 51 transfers the product carriers 6 from the return level 102 to the production level 101 and the second level device 52 transfers the product carriers 6 from the production level 101 to the return level 102.

This system 1 allows that the first and second transport devices 7 and 8 are not only used to transfer the product carriers 6 along the production trajectory, but also assist in transferring the product carriers 6 from the end of the processing trajectory 10 (the production end location 20) back to the start of the processing trajectory 10 (production start location 19). This way an efficient automatic transfer of the product carriers 6 from the end of the processing trajectory 10 back to the start of the processing trajectory 10 is achieved. In addition, the construction of the system 1 is kept relatively simple.

In the shown embodiment of the system 1, the first transport device 7 and the second transport device 8 are configured to transfer the product carriers 6 at the production level 101 from the first transport device 7 indirectly to the second transport device 8 and at the return level 102 from the second transport device 8 indirectly to the first transport device 7. More specifically, the first transport device 7 and the second transport device 8 move the product carriers 6 along part of the processing trajectory 10 and part of the retrieval trajectory 30, and the product carriers 6 are at the processing level and the retrieval level transferred between the first transport device 7 and the second transport device 8 by eight further transport devices 9A-H.

In an alternative embodiment of the system 1 (not shown), the first transport device 7 and the second transport device 8 are configured to transfer the product carriers 6 at the production level 101 from the first transport device 7 directly to the second transport device 8 and at the return level 102 from the second transport device 8 directly to the first transport device 7. In said situation, the first transport device 7 and the second transport move the product carriers 6 along the complete processing trajectory 10 and the complete retrieval trajectory 30.

The FIG. 4A-C show top views of the system 1 of FIG. 1. FIG. 4A shows the situation of FIG. 1. FIG. 4B shows the system 1 while only holding product carriers 6 positioned along the processing trajectory 10. FIG. 4C shows the system 1 while only holding product carriers 6 positioned along the retrieval trajectory 30.

FIG. 5A shows the product carriers 6 positioned along the processing trajectory 10 and the retrieval trajectory 30 in the situation of FIG. 4A. FIG. 5B shows the product carriers 6 positioned along the processing trajectory 10 in the situation of FIG. 4B. FIG. 5C shows the product carriers 6 positioned along the retrieval trajectory 30 in the situation of FIG. 4C.

FIG. 6A shows the processing trajectory 10 and the retrieval trajectory 30 in the situation of FIG. 4A. FIG. 6B shows the processing trajectory 10 in the situation of FIG. 4B. FIG. 6C shows the retrieval trajectory 30 in the situation of FIG. 4C.

The FIGS. 7A-B show views in perspective of the first transport device 7 of the system 1 of FIG. 1. The first production moving units 11 are provided in a first production rotary member 21 which is rotatable around a first transport rotation axis 23. A first production support rail 24 is provided to support the product carriers 6 when moving along the starting production part 17 of the processing trajectory 10. The first return moving units 31 are provided in a first return rotary member 41 which is rotatable around the first transport rotation axis 23. A first return support rail 44 is provided to support the product carriers 6 when moving along the ending return part 38 of the retrieval trajectory 30.

The first transport device 7 is configured to move the first production moving units 11 and the first return moving units 31 synchronously.

A first transporter driver 61 is provided to move the first production moving units 11 along the first endless production trajectory 13 and the first return moving units 31 along the first endless return trajectory 33.

The product carriers 6 hold the device parts 3 in a predetermined orientation 67 relative to the product carriers 6. Each product carrier comprises a longitudinal axis 63 and the first transport device 7 and the second transport device 8 move the product carriers 6 while maintaining their longitudinal axes 63 in a vertical position.

FIG. 8A shows a top view the first transport device 7 of FIG. 7. FIG. 8B shows the relevant parts of the first transport device 7 located at the production level 101. The first production moving units 11 are positioned side by side at a first production distance 71 from each other. FIG. 8C shows the relevant parts of the first transport device 7 located at the return level 102. The first return moving units 31 are positioned side by side at a first return distance 73 from each other. The first production distance 71 is equal to the first return distance 73.

FIG. 9A shows a top view the second transport device 8. The second production moving units 14 are provided in a second production rotary member 22 which is rotatable around a second transport rotation axis 43. A second production support rail 25 is provided to support the product carriers 6 when moving along the ending production part 18 of the processing trajectory 10. The second return moving units 34 are provided in a second return rotary member 42 which is rotatable around the second transport rotation axis 43. A second return support rail 45 is provided to support the product carriers 6 when moving along the starting return part 37 of the retrieval trajectory 30. The second transport device 8 is configured to move the second production moving units 14 and the second return moving units 34 synchronously. A second transporter driver 62 is provided to move the second production moving units 14 along the second endless production trajectory 16 and the second return moving units 34 along the second endless return trajectory 36. FIG. 9B shows the relevant parts of the second transport device 8 located at the production level 101. The second production moving units 14 are positioned side by side at a second production distance 72 from each other. FIG. 9C shows the relevant parts of the second transport device 8 located at the return level 102. The second return moving units 34 are positioned side by side at a second return distance 74 from each other. The second production distance 72 is equal to the second return distance 74.

The FIGS. 10A-C show views in perspective of the first level device 51 of the system 1 of FIG. 1. The first level device 51 comprises a first level housing 56 having a first inner helical level guide groove 57 extending from the return level 102 until the production level 101 and a first level rotary member 54 which is rotatable about a first level rotation axis 53. The first level rotary member 54 comprises first level moving units 55 to move the product carriers 6 through the first level guide groove 57 from the return level 102 to the production level 101. A first level driver 58 is provided to rotate the first level rotary member 54 in the first level housing 56, The second level device 52 has a similar construction. The second level device 52 comprises a second level housing 86 having a second inner helical level guide groove 87 extending from the production level 101 until the return level 102 and a second level rotary member 84 which is rotatable about a second level rotation axis 83. The second level rotary member 84 comprises second level moving units 85 to move the product carriers 6 through the second level guide groove 87 from the production level 101 to the return level 102. A second level driver 59 is provided to rotate the second level rotary member 84 in the second level housing 86.

The first level device 51 and the second level device 52 move the product carriers 6 while maintaining their longitudinal axes in the vertical position.

FIG. 11 schematically shows a bottom view of the system 1 of FIG. 1. The first transporter driver 61 is driven by a first electrical motor 64. Since the first level driver 58 is mechanically coupled to the first transporter driver 61, the first level device 51 is also driven by the first electrical motor 64. Seven further transport devices 9A, B, D-H, the second transport device 8 and the second level device 52 are also mechanically coupled to the first electrical motor 64. One further transport device 9C is driven by a second electrical motor 65.

The invention relates to a system according to any one of the following clauses.

1. System for performing a processing step on device parts of simulated smoking devices, such as electronic cigarettes, said system comprising;
    a processing station to perform the processing step on the device parts,
    product carriers to hold the device parts during the processing step,
    a first transport device and a second transport device to move the product carriers along at least part of a processing trajectory extending through the processing station, wherein;
    the first transport device comprises multiple first production moving units for moving the product carriers, which first production moving units are positioned side by side while forming a first endless production configuration at a production level and are movable along a first endless production trajectory defined by the first endless production configuration,
    the second transport device comprises multiple second production moving units for moving the product carriers, which second production moving units are positioned side by side while forming a second endless production configuration at the production level and are movable along a second endless production trajectory defined by the second endless production configuration,
    said at least part of the processing trajectory is formed by a starting production part of the first endless production trajectory and an ending production part of the second endless production trajectory,
    the processing trajectory starts at a production start location located most upstream of the starting production part of the first endless production trajectory and ends at a production end location located most downstream of the ending production part of the second endless production trajectory,
    the first transport device and the second transport device are further configured to move the product carriers along at least part of a retrieval trajectory,
    the first transport device further comprises multiple first return moving units for moving the product carriers, which first return moving units are positioned side by side while forming a first endless return configuration at a return level located at a level distance from the production level and are movable along a first endless return trajectory defined by the first endless return configuration,
    the second transport device further comprises multiple second return moving units for moving the product carriers, which second return moving units are positioned side by side while forming a second endless return configuration at the return level and are movable along a second endless return trajectory defined by the second endless return configuration,
    said at least part of the retrieval trajectory is formed by a starting return part of the second endless return trajectory and an ending return part of the first endless return trajectory,
    the retrieval trajectory starts at a return start location located most upstream of the starting return part of the second endless return trajectory and ends at a return end location located most downstream of the ending return part of the first endless return trajectory,
    a first level device is provided to transfer the product carriers from the return end location to the production start location, and
    a second level device is provided to transfer the product carriers from the production end location to the return start location.
2. System according to clause 1, wherein the first level device transfers the product carriers from the return level to the production level and the second level device transfers the product carriers from the production level to the return level.
3. System according to clause 1 or 2, wherein the first transport device moves the first production moving units and the first return moving units synchronously, and the second transport device moves the second production moving units and the second return moving units synchronously.
4. System according to any one of the preceding clauses, wherein;
    a first transporter driver is provided to move the first production moving units along the first endless production trajectory and the first return moving units along the first endless return trajectory, and
    a second transporter driver is provided to move the second production moving units along the second endless production trajectory and the second return moving units along the second endless return trajectory.
5. System according to any one of the preceding clauses, wherein;
    the first level device comprises a first level housing having a first inner helical level guide groove extending from the return level until the production level and a first level rotary member which is rotatable about a first level rotation axis, the first level rotary member comprises first level moving units to move the product carriers through the first level guide groove from the return level to the production level, the second level device comprises a second level housing having a second inner helical level guide groove extending from the production level until the return level and a second level rotary member which is rotatable about a second level rotation axis, and the second level rotary member comprises second level moving units to move the product carriers through the second level guide groove from the production level to the return level.

6. System according to clause 4 and 5, wherein;
a first level driver is provided to rotate the first level rotary member in the first level housing, and
a second level driver is provided to rotate the second level rotary member in the second level housing.

7. System according to clause 6, wherein the first level driver is mechanically coupled to the first transporter driver and the second level driver is mechanically coupled to the second transporter driver.

8. System according to any one of the preceding clauses, wherein the first transport device and the second transport device are configured to transfer the product carriers at the production level from the first transport device to the second transport device and at the return level from the second transport device to the first transport device.

9. System according to any one of the preceding clauses, wherein the first transport device and the second transport device are configured to transfer the product carriers at the production level from the first transport device directly to the second transport device and at the return level from the second transport device directly to the first transport device.

10. System according to clause 9, wherein the first transport device and the second transport move the product carriers along the complete processing trajectory and the complete retrieval trajectory.

11. System according to any one of the clauses 1-8, wherein the first transport device and the second transport device are configured to transfer the product carriers at the production level from the first transport device indirectly to the second transport device and at the return level from the second transport device indirectly to the first transport device.

12. System according to clause 11, wherein;
the first transport device and the second transport device move the product carriers along part of the processing trajectory and part of the retrieval trajectory, and
the product carriers are at the processing level and the retrieval level transferred between the first transport device and the second transport device by at least one further transport device.

13. System according to any one of the preceding clauses, wherein each product carrier comprises a longitudinal axis and the first transport device and the second transport device move the product carriers while maintaining their longitudinal axes in a vertical position.

14. System according to any one of the preceding clauses, wherein the first level device and the second level device move the product carriers while maintaining their longitudinal axes in the vertical position.

15. System according to any one of the preceding clauses, wherein the product carriers hold the device parts in a predetermined orientation relative to the product carriers.

16. System according to any one of the preceding clauses, wherein;
the first production moving units are positioned side by side at a first production distance from each other,
the second production moving units are positioned side by side at a second production distance from each other,
the first return moving units are positioned side by side at a first return distance from each other, and
the second return moving units are positioned side by side at a second return distance from each other.

17. System according to clause 16, wherein the first production distance is equal to the first return distance and the second production distance is equal to the second return distance.

18. System according to any one of the preceding clauses, wherein the level distance is measured in a vertical direction.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the system without departing from the scope as defined in the claims.

The invention claimed is:
1. A system for performing a processing step on device parts of simulated smoking devices, such as electronic cigarettes, said system comprising:
a processing station to perform the processing step on the device parts,
product carriers to hold the device parts during the processing step,
a first transport device and a second transport device to move the product carriers along at least part of a processing trajectory extending through the processing station, wherein:
the first transport device comprises multiple first production moving units for moving the product carriers, which first production moving units are positioned side by side while forming a first endless production configuration at a production level and are movable along a first endless production trajectory defined by the first endless production configuration,
the second transport device comprises multiple second production moving units for moving the product carriers, which second production moving units are positioned side by side while forming a second endless production configuration at the production level and are movable along a second endless production trajectory defined by the second endless production configuration, said at least part of the processing trajectory is formed by a starting production part of the first endless production trajectory and an ending production part of the second endless production trajectory, the processing trajectory starts at a production start location located most upstream of the starting production part of the first endless production trajectory and ends at a production end location located most downstream of the ending production part of the second endless production trajectory, the first transport device and the second transport device are further configured to move the product carriers along at least part of a retrieval trajectory, the first transport device further comprises multiple first return moving units for moving the product carriers, which first return moving units are positioned side by side while forming a first endless return configuration at a return level located at a level distance from the production level and are movable along a first endless return trajectory defined by the first endless return configuration, the second transport device further comprises multiple second return moving units for moving the product carriers, which second return moving units are positioned side by side while forming a second endless return configuration at the return level and are movable along a second endless return trajectory defined by the second endless return configuration, said at least part of the retrieval trajectory is formed by a starting return part of the second endless return trajectory and an ending return part of the first endless return trajectory, the retrieval trajectory starts at a return start location located most upstream of the starting return part of the second endless return trajectory and ends at a return end location located most downstream of the ending return part of the first endless return trajectory, a first level device is provided to transfer the product carriers from the return end location to the production start location, a second level device is provided to transfer the product carriers from the production end location to the return start location, the first level device comprises a first level housing having a first inner helical level guide groove extending from the return level until the production level and a first level rotary member which is rotatable about a first level rotation axis, the first level rotary member comprises first level moving units to move the product carriers through the first level guide groove from the return level to the production level, the second level device comprises a second level housing having a second inner helical level guide groove extending from the production level until the return level and a second level rotary member which is rotatable about a second level rotation axis, and the second level rotary member comprises second level moving units to move the product carriers through the second level guide groove from the production level to the return level.

2. The system according to claim 1, wherein:
a first production support rail is provided to support the product carriers when moving along the starting production part of the processing trajectory,
a first return support rail is provided to support the product carriers when moving along the ending return part of the retrieval trajectory,
a second production support rail is provided to support the product carriers when moving along the ending production part of the processing trajectory,
a second return support rail is provided to support the product carriers when moving along the starting return part of the retrieval trajectory,
the first production support rail aligns with the first level guide groove at the production level,
the first return support rail aligns with the first level guide groove at the return level,
the second production support rail aligns with the second level guide groove at the production level, and
the second return support rail aligns with the second level guide groove at the return level.

3. The system according to claim 1, wherein:
the first production moving units are provided in a first production rotary member which is rotatable around a first transport rotation axis,
the first return moving units are provided in a first return rotary member which is rotatable around the first transport rotation axis,
the second production moving units are provided in a second production rotary member which is rotatable around a second transport rotation axis, and
the second return moving units are provided in a second return rotary member which is rotatable around the second transport rotation axis.

4. The system according to claim 1, wherein the first level moving units extend from the return level until the production level and the second level moving units extend from the production level until the return level.

5. The system according to claim 1, wherein:
the first and second level rotary members are configured to move the product carriers around the first and second level rotation axes and to allow the product carriers to move in vertical direction within the first and second level moving units, and
the first and second level guide grooves are configured to move the product carriers in vertical direction within the first and second level moving units.

6. The system according to claim 1, wherein the first helical level guide groove extends around the first level rotary member, more specifically around the first level moving units, and the second helical level guide groove extends around the second level rotary member, more specifically around the second level moving units.

7. The system according to claim 1, wherein the first level rotary member is configured to slide the product carriers through the first level guide groove from the return level to the production level, and the second level rotary is configured to slide the product carriers through the second level guide groove from the production level to the return level.

8. The system according to claim 1, wherein the first level guide groove and the second level guide groove are stationary.

9. The system according to claim 1, wherein the first level device transfers the product carriers from the return level to the production level and the second level device transfers the product carriers from the production level to the return level.

10. The system according to claim 1, wherein the first transport device moves the first production moving units and the first return moving units synchronously, and the second transport device moves the second production moving units and the second return moving units synchronously.

11. The system according to claim 1, wherein:
a first transporter driver is provided to move the first production moving units along the first endless production trajectory and the first return moving units along the first endless return trajectory, and
a second transporter driver is provided to move the second production moving units along the second endless production trajectory and the second return moving units along the second endless return trajectory.

12. The system according to claim 1, wherein:
a first level driver is provided to rotate the first level rotary member in the first level housing, and
a second level driver is provided to rotate the second level rotary member in the second level housing.

13. The system according to claim 1, wherein the first transport device and the second transport device are configured to transfer the product carriers at the production level from the first transport device to the second transport device and at the return level from the second transport device to the first transport device.

14. The system according to claim 1, wherein the first transport device and the second transport device are configured to transfer the product carriers at the production level from the first transport device directly to the second transport device and at the return level from the second transport device directly to the first transport device.

15. The system according to claim 1, wherein the first transport device and the second transport device are configured to transfer the product carriers at the production level from the first transport device indirectly to the second transport device and at the return level from the second transport device indirectly to the first transport device.

16. The system according to claim 15, wherein:
the first transport device and the second transport device move the product carriers along part of the processing trajectory and part of the retrieval trajectory, and
the product carriers are at the processing level and the retrieval level transferred between the first transport device and the second transport device by at least one further transport device.

17. The system according to claim 1, wherein each product carrier comprises a longitudinal axis and the first transport device and the second transport device move the product carriers while maintaining their longitudinal axes in a vertical position.

18. The system according to claim 1, wherein the first level device and the second level device move the product carriers while maintaining their longitudinal axes in the vertical position.

19. The system according to claim 1, wherein the product carriers hold the device parts in a predetermined orientation relative to the product carriers.

20. The system according to claim 1, wherein:
the first production moving units are positioned side by side at a first production distance from each other,
the second production moving units are positioned side by side at a second production distance from each other,
the first return moving units are positioned side by side at a first return distance from each other, and
the second return moving units are positioned side by side at a second return distance from each other.

* * * * *